(12) United States Patent
Griffin et al.

(10) Patent No.: US 12,553,359 B1
(45) Date of Patent: Feb. 17, 2026

(54) INTEGRALLY BLADED DISK LIFE CYCLE MANAGEMENT UTILIZING VIBRATORY DNA

(71) Applicant: Blade Diagnostics Corporation, Pittsburgh, PA (US)

(72) Inventors: Jerry H. Griffin, Pittsburgh, PA (US); Drew M. Feiner, New Orleans, LA (US); Blair Echols, Pittsburgh, PA (US)

(73) Assignee: Blade Diagnostics Corporation, Pittsburgh, PA (US)

( * ) Notice: Subject to any disclaimer, the term of this patent is extended or adjusted under 35 U.S.C. 154(b) by 1063 days.

(21) Appl. No.: 15/347,806

(22) Filed: Nov. 10, 2016

Related U.S. Application Data

(63) Continuation of application No. 15/253,928, filed on Sep. 1, 2016, now abandoned, which is a continuation-in-part of application No. 13/949,441, filed on Jul. 24, 2013, now Pat. No. 9,739,167.

(60) Provisional application No. 62/213,278, filed on Sep. 2, 2015, provisional application No. 61/675,707, filed on Jul. 25, 2012.

(51) Int. Cl.
    *F01D 17/02* (2006.01)

(52) U.S. Cl.
    CPC .......... *F01D 17/02* (2013.01); *F05D 2230/72* (2013.01); *F05D 2260/80* (2013.01)

(58) Field of Classification Search
    CPC .. F01D 17/02; F05D 2230/72; F05D 2260/80; F05D 2270/334
    See application file for complete search history.

(56) References Cited

U.S. PATENT DOCUMENTS

| | | |
|---|---|---|
| 3,721,120 A | 3/1973 | Howell et al. |
| 4,408,294 A | 10/1983 | Imam |
| (Continued) | | |

FOREIGN PATENT DOCUMENTS

| | | |
|---|---|---|
| CN | 101762385 A | 6/2010 |
| CN | 101782475 A | 7/2010 |
| (Continued) | | |

OTHER PUBLICATIONS

Murrell, Paul, "7.4 Computer Memory". "https://web.archive.org/web/20130721202618/http://statmath.wu.ac.at/courses/data-analysis/itdtHTML/node55.html" (Year: 2013).*

(Continued)

*Primary Examiner* — Yoshihisa Ishizuka
(74) *Attorney, Agent, or Firm* — Wolter Van Dyke Davis, PLLC; Eugene J. Molinelli

(57) ABSTRACT

A vibratory DNA is defined which uniquely characterizes the vibratory state of each integrally bladed disk (IBD) of a fleet and devolves the complex vibrational responses of the IBDs into simple metadata which can be stored in a database and manipulated for various fleet health management purposes. Vibratory DNA can be developed from test apparatus vibration data and can be used to assess the acceptability of a manufacturing or repair process. Changes in vibratory DNA resulting from operation of an IBD in a rotary machine are indicative of operationally induced wear or cracking and can be useful when determining a root cause of failure of an IBD. Vibratory DNA may be used with a reduced order model to perform a virtual engine test of an IBD.

21 Claims, 9 Drawing Sheets

(56) References Cited

U.S. PATENT DOCUMENTS

| | | | |
|---|---|---|---|
| 4,776,216 | A | 10/1988 | Barton et al. |
| 5,686,669 | A | 11/1997 | Herandez |
| 7,082,371 | B2 | 7/2006 | Griffin et al. |
| 7,206,709 | B2 | 4/2007 | Griffin et al. |
| 7,383,136 | B1 | 6/2008 | Griffin et al. |
| 7,432,505 | B2 | 10/2008 | Brummel |
| 2003/0167616 | A1* | 9/2003 | Harding ............... B23P 6/002 29/407.05 |
| 2005/0278127 | A1 | 12/2005 | Griffin |
| 2009/0301055 | A1 | 12/2009 | Kallappa |
| 2009/0320288 | A1* | 12/2009 | Yelistratov ............ B23K 26/24 29/889.1 |
| 2010/0161245 | A1 | 6/2010 | Vinay et al. |
| 2011/0132457 | A1 | 6/2011 | Finot |
| 2011/0213569 | A1 | 9/2011 | Zielinski et al. |
| 2011/0214878 | A1 | 9/2011 | Bailey et al. |
| 2012/0253697 | A1 | 10/2012 | Frankenstein et al. |
| 2014/0030092 | A1 | 1/2014 | Heinig et al. |
| 2014/0363274 | A1* | 12/2014 | Jousselin ............. F01D 21/003 415/118 |

FOREIGN PATENT DOCUMENTS

| | | | |
|---|---|---|---|
| CN | 102095803 | A | 6/2011 |
| CN | 102498372 | A | 6/2012 |
| DE | 102008057556 | A1 | 5/2010 |
| EP | 2299248 | A1 | 3/2011 |
| JP | 63229333 | A | 9/1988 |
| JP | 3064630 | U | 1/2000 |
| JP | 2000506262 | A | 5/2000 |
| JP | 2003177059 | A | 6/2003 |
| JP | 2012137054 | A | 7/2012 |
| WO | 8201416 | A1 | 4/1982 |
| WO | 2008093349 | A1 | 8/2008 |

OTHER PUBLICATIONS

J.H Griffin, "A Reduced-Order Model of Mistuning Using a Subset of Nominal System Modes", Journal of Engineering for Gas Turbines and Power Oct. 2001, vol. 123 (Year: 2001).*

J.H Griffin, "A Fundamental Model of Mistuning for a Single Family of Modes", Journal of Turbomachinery Copyright © 2002 by ASME Oct. 2002, vol. 124 (Year: 2002).*

Feiner D. M. et al, "A Fundamental Model of Mistuning for a Single Family of Modes", ASME Journal of Turbomachinery, vol. 124, Oct. 2002, pp. 597-605.

Feiner D. M. et al, "Mistuning Identification of Bladed Disks Using a Fundamental Model of Mistuning—Part I: Theory," ASME Journal of Turbomachinery, 2004, 126(1), pp. 150-158.

Feiner D. M. et al, "Mistuning Identification of Bladed Disks Using a Fundamental Model of Mistuning—Part II: Application," ASME Journal of Turbomachinery, 2004, 126(1), pp. 159-165.

Whitehead D.S., "The Maximum Factor by Which Forced Vibration of Blades Can Increase Due to Mistuning," Journal of Engineering for Gas Turbines and Power, vol. 120, Jan. 1998, pp. 115-119.

Griffin J. H. et al, "Model Development and Statistical Investigation of Turbine Blade Mistuning," Journal of Vibration, Stress, and Reliability in Design, vol. 106, Apr. 1984, pp. 204-210.

Yang M.-T. et al, "A Reduced Order Approach for the Vibration of Mistuned Bladed Disk Assemblies," ASME Journal of Engineering for Gas Turbines and Power, vol. 119, 1997, pp. 161-167.

Judge John A. et al, "Mistuning Identification in Bladed Disks," Proceedings of the International Conference on Structural Dynamics Modeling, Madeira Island, Portugal, 2002.

Yang M.-T. et al, "A Reduced-Order Model of Mistuning Using a Subset of Nominal System Modes," Journal of Engineering for Gas Turbines and Power, vol. 123, Oct. 2001, pp. 893-900.

Ewins, D. J. et al, "A Method for Modal Identification of Lightly Damped Structures", Journal of Sound and Vibration, vol. 84, No. 1, 1982, pp. 57-59.

Yang M.-T. et al, "A Reduced-Order Model of Mistuning Using a Subset of Nominal System Modes," Presented at the International Gas Turbine & Aeroengine Congress & Exhibition Jun. 7-9, 1999, (with Discussion accepted at ASME Headquarters until Sep. 30, 1999), pp. 1-11.

Griffin J. H. et al:, "Engineering a Breakthrough in Aircraft Safety", Department of Mechanical Engineering at Carnegie Mellon, Carnegie Mech, vol. 8, No. 1, Fall 2004, pp. 3-4.

Tappert Peter et al, "The Last Few Minutes Prior to a Fatigue Blade Failure in an Axial Compressor: Observations of Blade Vibration and Blade Lean," 2007 IEEE Aerospace Conference, Big Sky, MT, Mar. 3-10, 2007, pp. 1-8 (Abstract only).

\* cited by examiner

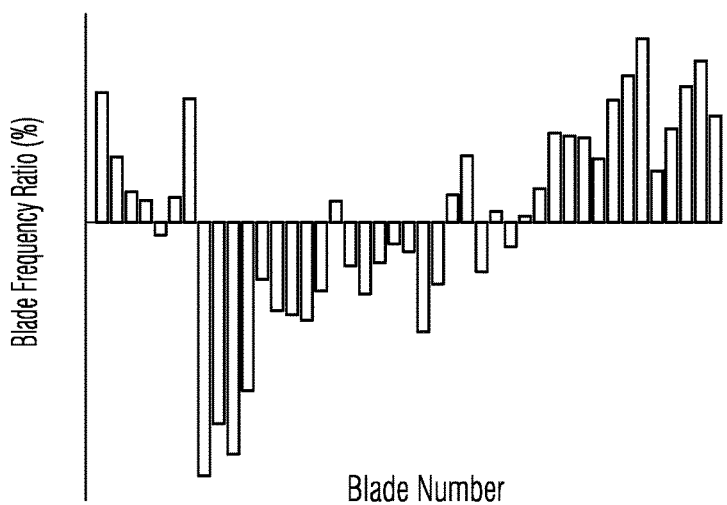
FIG. 6
FIG. 7
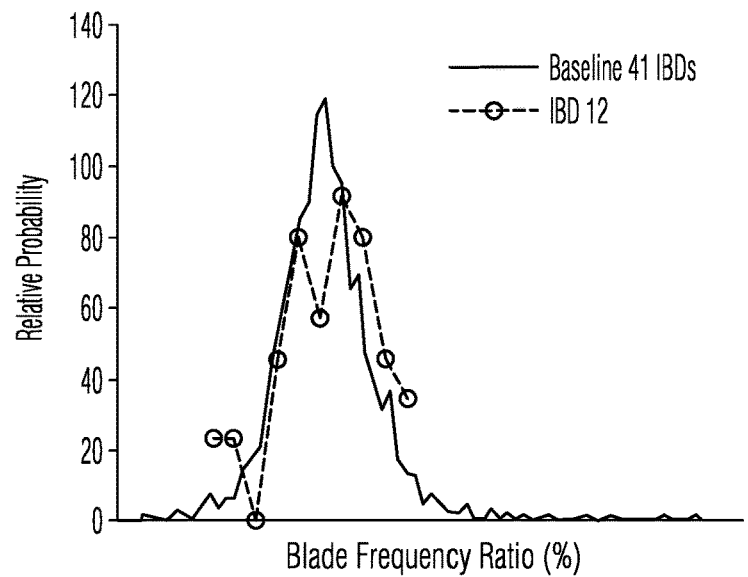
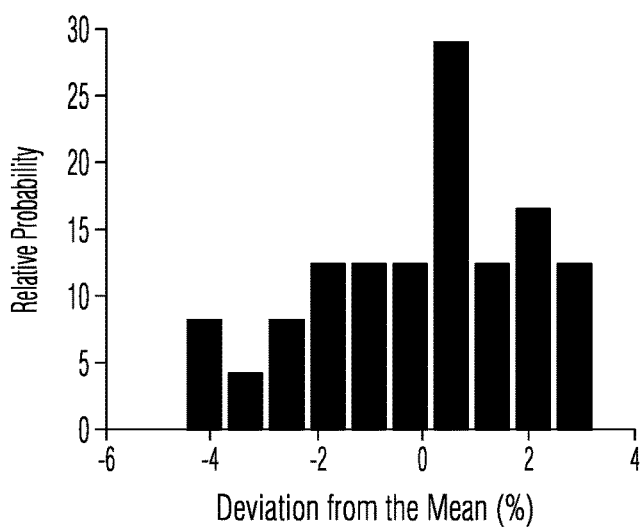
FIG. 8A

| Engine Order | Mode Number | | | | | | | |
|---|---|---|---|---|---|---|---|---|
| | 1 | 2 | 3 | 4 | 5 | 6 | 7 | 8 |
| 0 | 0.00% | 0.00% | 0.00% | 0.00% | 0.00% | 0.00% | 0.00% | 0.00% |
| 1 | 0.00% | 0.00% | 0.00% | 0.00% | 0.00% | 0.00% | 0.95% | 0.00% |
| 2 | 0.00% | 0.00% | 0.00% | 0.00% | 0.00% | 0.00% | 0.00% | 1.13% |
| 3 | 0.00% | 0.00% | 0.00% | 0.00% | 0.00% | 0.00% | 0.00% | 0.83% |
| 4 | 0.00% | 0.00% | 0.00% | 0.00% | 0.00% | 0.00% | 0.00% | 0.00% |
| 5 | 0.00% | 0.00% | 0.00% | 21.73% | 1.55% | 0.00% | 0.00% | 0.00% |
| 6 | 0.00% | 0.00% | 0.00% | 2.39% | 0.00% | 0.00% | 0.00% | 0.00% |
| 7 | 0.00% | 0.00% | 0.00% | 42.79% | 2.01% | 0.00% | 0.25% | 0.00% |
| 8 | 0.00% | 0.00% | 0.00% | 1.02% | 3.34% | 0.00% | 0.00% | 5.06% |
| 9 | 0.00% | 0.00% | 0.00% | 0.00% | 0.00% | 0.41% | 1.47% | 0.00% |
| 10 | 0.00% | 11.46% | 0.00% | 12.03% | 0.00% | 0.00% | 0.00% | 0.00% |
| 11 | 0.00% | 8.64% | 2.61% | 0.58% | 2.23% | 0.00% | 1.77% | 0.00% |
| 12 | 0.00% | 1.90% | 0.00% | 0.00% | 0.87% | 0.00% | 0.00% | 0.00% |
| 13 | 0.00% | 0.00% | 0.00% | 23.34% | 1.25% | 0.00% | 1.24% | 0.00% |
| 14 | 0.00% | 0.00% | 0.00% | 0.00% | 1.16% | 0.00% | 0.00% | 0.00% |
| 15 | 0.35% | 0.00% | 0.00% | 0.00% | 4.56% | 0.00% | 0.00% | 0.00% |
| 16 | 3.29% | 0.00% | 0.00% | 0.00% | 2.83% | 0.00% | 0.00% | 0.00% |
| 17 | 2.54% | 0.00% | 0.00% | 0.00% | 0.00% | 0.00% | 0.00% | 1.73% |
| 18 | 0.23% | 0.00% | 0.00% | 0.00% | 0.00% | 0.00% | 0.00% | 0.00% |

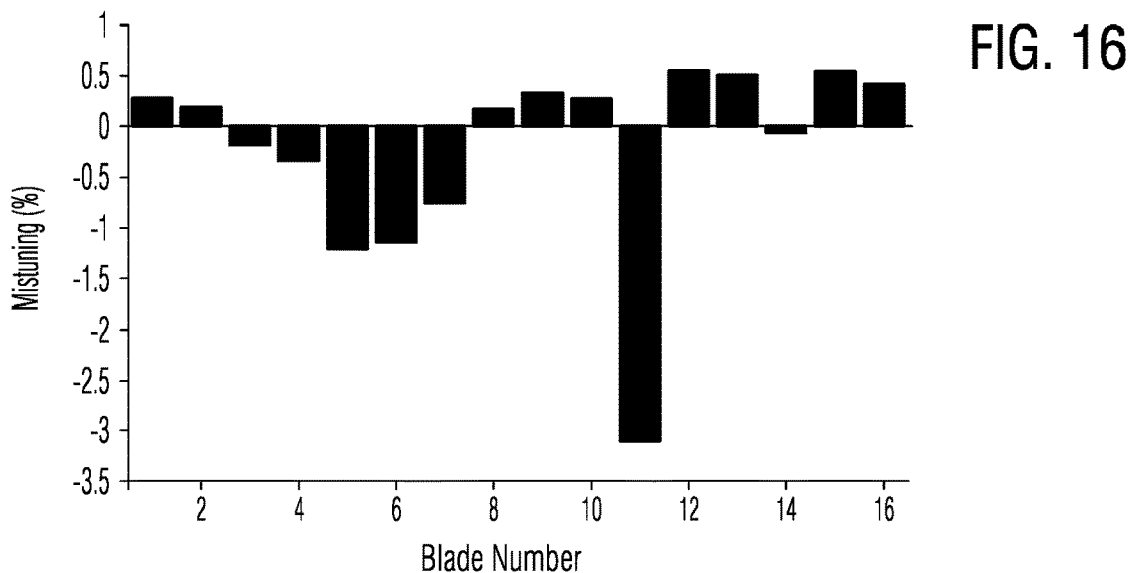
FIG. 16
FIG. 17
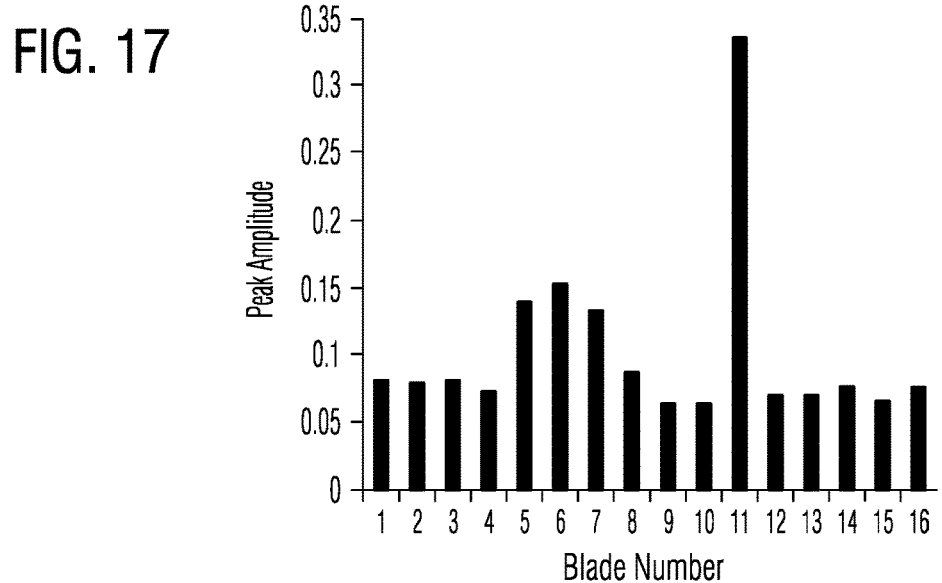
FIG. 18

INTEGRALLY BLADED DISK LIFE CYCLE MANAGEMENT UTILIZING VIBRATORY DNA

This application is a continuation of U.S. patent application Ser. No. 15/253,928 filed 1 Sep. 2016, which claimed benefit of the 2 Sep. 2015 filing date of U.S. provisional application No. 62/213,278, and which is also a continuation-in-part of U.S. patent application Ser. No. 13/949,441 filed 24 Jul. 2013 (publication number US 2014/0030092 A1), which in turn claimed benefit of the 25 Jul. 2012 filing date of U.S. provisional application No. 61/675,707. The entire content of each one of these previous applications is incorporated by reference herein.

FIELD OF THE INVENTION

This invention relates generally to the field of power generating equipment, and more particularly to the inspection and maintenance of rotary machines such as the rotary disks of turbine engines.

BACKGROUND OF THE INVENTION

Integrally bladed disks (IBDs) are a relatively recent development in gas turbine engine technology. IBDs are bladed disks in which the blades and disk (or hub) form one continuous structure. The blades may be welded to the disk or formed integrally with the disk by being milled from a single block of material. IBDs are also referred to in the aerospace industry as blisks or as integrally bladed rotors (IBRs). While IBDs are becoming more popular in gas turbine aero engines, earlier traditional aero engine designs as well as many current industrial turbine and compressor designs have individual blades that are held in place by inserting them into slots in the disk.

Turbine blades on a bladed disk are part of a dynamic system with a complex vibratory response. For example, consider the difference in the vibratory response of a single turbine blade in isolation and a set of turbine blades mounted to a disk. A single turbine blade in isolation has mode shapes such as first bending and first torsion that generally have broadly spaced natural frequencies, resulting in a relatively simple vibratory response. However, when a set of turbine blades are mounted on a disk, they interact with each other producing large numbers of modes with closely spaced frequencies and more complex dynamics. A disk with N blades will have N modes with similar frequency in which the airfoils deflect in a first bending shape, and N modes with similar frequency in which the airfoils deflect in a first torsion shape. These sets of modes with similar airfoil deflection patterns are referred to as mode families.

Ideally, all of the blades on a single disk are identical to each other, but this is not the case in reality. When it comes to vibration, no two IBDs are alike. Every IBD has a unique set of properties that causes it to vibrate differently from all other bladed disks, even those of the same design. Differences in individual blades due to manufacturing tolerances, wear, damage or repairs will cause them to vibrate at different frequencies. This phenomenon of blades having different frequencies from each other is called mistuning. Because of mistuning and the associated complex vibrational behavior, some blades of an IBD can vibrate strongly while others are not vibrating at all. Blades with a higher vibratory response are more susceptible to high cycle fatigue damage, and because mechanical failure of a bladed disk is such a catastrophic event, there has been a long felt need by operators of turbine engines to be able to predict, and thereby to prevent, vibration-induced damage and associated failures.

It has long been known that cracks can affect the vibration frequency of a rotating apparatus, however, that knowledge has not previously developed into a workable technique for preventing crack-induced failures. A report published at the 2007 IEEE Aerospace Conference showed that a growing crack in an axial compressor blades was detectable twelve minutes prior to blade failure using a blade tip vibration measuring system. While useful as part of the investigation of the root cause of the failure, such technology is not effective for predicting or preventing such failures.

European patent application EP 2 299 248 A1 (filed 14 Sep. 2009) discloses a method wherein the theoretical natural frequency of a turbine blade is calculated by finite element analysis, then the actual vibrational frequency of that blade is measured during its operation in a turbine, with a difference in those two values being interpreted as an indication of the existence of a crack in the blade. However, the accuracy of such a method is limited because the theoretical natural frequency represents the blade structure alone, whereas the actual vibrational frequency is affected by interaction with the bladed disk as a whole. Moreover, variables such as temperature and pressure affect the frequency, so multiple theoretical calculations are required for various operating condition assumptions in order to be able to match the theoretical calculation with the actual engine operating conditions.

Thus, there is an ongoing need for further improvements in monitoring, predicting and managing the vibrational performance of blades, disks and IBDs in turbine engines.

SUMMARY OF THE INVENTION

The present inventors have discovered a method of simplifying and solving the ongoing problem of how to manage the vibratory performance of turbine blades, particularly those of integrally bladed disks (IBDs), so that the failure of blades can be prevented, or when a failure does occur, that it can be properly diagnosed so that the failure of other blades of similar design can be prevented. The inventors have devolved this complex problem by first defining and then utilizing the vibratory DNA of an IBD. The term "vibratory DNA" (or vibration DNA) is used herein to mean a set of parameters that uniquely characterizes the vibratory state of an IBD. These parameters distinguish one IBD from another with sufficient clarity to permit a person using the vibratory DNA to achieve his/her purpose, for example to select an appropriate physical activity to perform related to the IBD. Such physical activities may include, for example, removing the IBD from service in a turbine engine, returning the IBD to service in a turbine engine, performing a mechanical repair of the IBD, mechanically modifying the IBD, modifying a manufacturing process used to produce the IBD, modifying a physical operating condition of a rotary machine in which the IBD is operating to modify stresses imposed on the IBD, or performing a maintenance activity on a fleet of IBDs in an order responsive to values of the vibratory DNA of the respective IBDs.

Akin to genetic DNA (deoxyribonucleic acid), vibratory DNA not only characterizes the mechanical structure itself, but also distinguishes how the structure will function in a vibratory environment in a way which is unique from any other structure with a different vibratory DNA. By recognizing that the overall life cycle management of an IBD can be optimized by defining and using a relatively simple set of parameters unique to the IBD (it's vibratory DNA), the present inventors have significantly advanced the ability of the industry to resolve this long standing problem.

The present inventors have further recognized that a vibratory DNA must be sufficiently discriminatory to be able to distinguish the manufacturing tolerances of two IBDs built to the same design in order to be functionally useful as a bladed disk management tool. Moreover, the vibratory DNA must be independent of the operating environment of the IBD, such as pressure and temperature. Importantly, the vibratory DNA of an IBD must reflect and be useful for predicting the complex vibrational interactions among the plurality of blades and the disk of the IBD under a variety of engine operating conditions. In one non-limiting example described herein, vibratory DNA is expressed as the nodal diameter plot and blade frequency ratios of an IBD in one or more families of vibration modes. These parameters can be determined by analyzing vibration data from the IBD using known calculational techniques and models, such and the Fundamental Mistuning Model (FMM) described in U.S. Pat. No. 7,082,371 B2, incorporated by reference herein.

Once the vibratory DNA of an IBD is defined, it can be used in many ways helpful to the designer, manufacturer and owner of the IBD. The vibratory DNA may be stored in a database along with the vibratory DNA of other IBDs of the same design, thereby functioning as metadata which may be manipulated for manufacturing quality control; design of repairs and repair quality control; outage planning; root cause analysis; evaluating engine operating conditions; evaluating engine tests and performing virtual engine tests; monitoring engine wear; etc. These and other aspects of the invention are described in more detail as follows.

BRIEF DESCRIPTION OF THE DRAWINGS

The invention is explained in the following description in view of the drawings that show:

FIG. 6 illustrates blade frequency ratio verses position on the disk.

FIG. 7 illustrated a comparison of frequency ratios to average values.

FIG. 8A-8C illustrate the total variation in blade frequencies.

FIG. 16 illustrates the blade frequency ratios of the IBD of FIG. 15.

FIG. 17 illustrates the vibration amplitudes for the IBD of FIG. 15.

FIG. 18 illustrates the vibration amplitudes for the IBD of FIG. 15 if it had been modified.

DETAILED DESCRIPTION OF THE INVENTION

Introduction

Mistuning has vexed engineers because traditional finite element analysis techniques are not workable for complex structures such as integrally bladed disks (IBDs) given the limitations of existing computing capabilities. The disclosed methods of using vibratory DNA to characterize the vibratory state of a structure are well suited for IBDs because the blades cannot be removed and individually tested, so only full rotor testing is available, and test results are difficult to interpret because of the very complex system dynamics in which the blades interact with each other. Defining the vibratory DNA of an IBD provides a systematic way of interpreting vibration data and characterizing an IBD's vibratory state, thereby simplifying the task of blade management.

Note that this invention may also be applicable to a rotor assembly where the blades are formed separately from the disk and are inserted into a slot(s) in the disk, but only when such assembly is being rotated such that centrifugal forces acting on the blades constrain them in the slot(s) with sufficient rigidity to allow the blade vibrations to interact in the manner of an integrally formed assembly. Accordingly, as used herein, the terms "integrally bladed disk" and "IBD" are meant to include all such forms of integral, joined and centrifugally loaded disk/blade assemblies. It should be noted, however, that the specific blade/slot interface conditions can affect the vibratory DNA, so movement of a blade within a slot will introduce a degree of uncertainty which does not exist with integrally formed or joined structures.

The process for characterizing the vibratory state of individual blades is fairly well standardized. One reason that individual blades are easier to characterize is that they have a relatively small number of modes in the operating range, typically 4 to 20, and the natural frequencies are relatively isolated. As a result, it is a straight forward process to extract the natural frequencies and mode shapes of individual blades using standard testing techniques and modal identification routines. Consequently, it is possible to use mode shape and natural frequency information to monitor the vibratory state of individual blades. This information is often used by the manufacturer for quality control purposes. The present inventors have recognized that, by defining a vibratory DNA of an IBD, it is possible to provide a similar capability for managing IBDs in spite of the fact that it is not possible to perform vibration tests on the individual blades.

Figure 1:
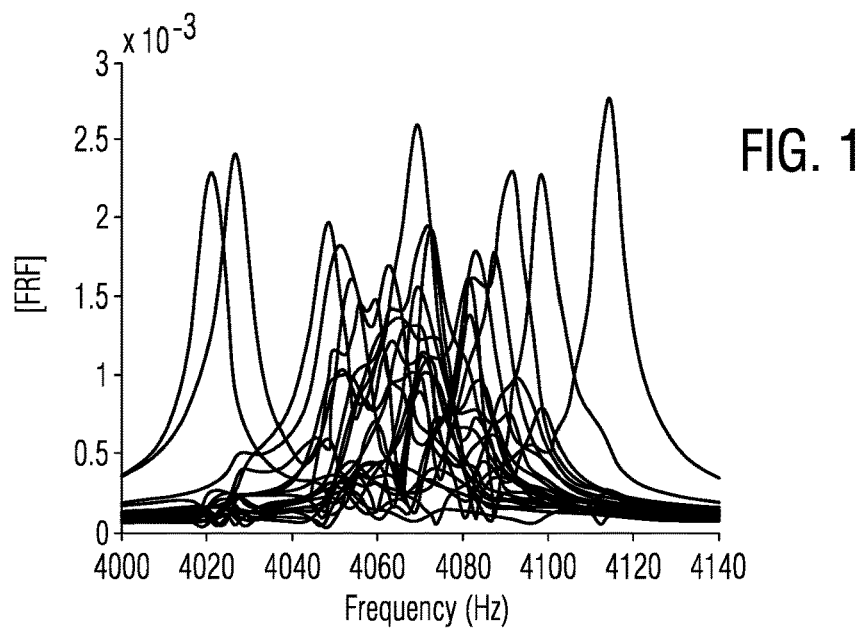
FIG. 1 is a graph of the measured frequency response of blades of an IBD in its first torsion modes.

The challenges with IBDs include that it is necessary to measure the vibratory response of the bladed disk as a system, that multiple blades participate in the system modes, and that there are hundreds of these modes with frequencies that could be excited in the engine. For example, the frequency responses of an IBD in its first torsion modes are depicted in FIG. 1 where the different lines correspond to the frequency responses of the different blades. Notice that the blades all respond differently, and that they each have many resonant peaks which indicates that they participate in many of the system modes in this frequency region. The system mode shape of an actual IBD does not have the simple nodal diameter behavior predicted by a single sector, cyclic symmetric finite element model. Consequently, it is not a straight forward process to compare experimental results to finite element predictions based on the geometry of a single, idealized blade/disk sector. However, the use of vibratory DNA rather than frequency response information to represent the vibration state of an IBD provides a systematic approach for devolving such complex data so that the basic information that characterizes vibratory response can be determined and used for quality control and other health monitoring purposes.

Identification of Vibratory DNA

Figure 2A:
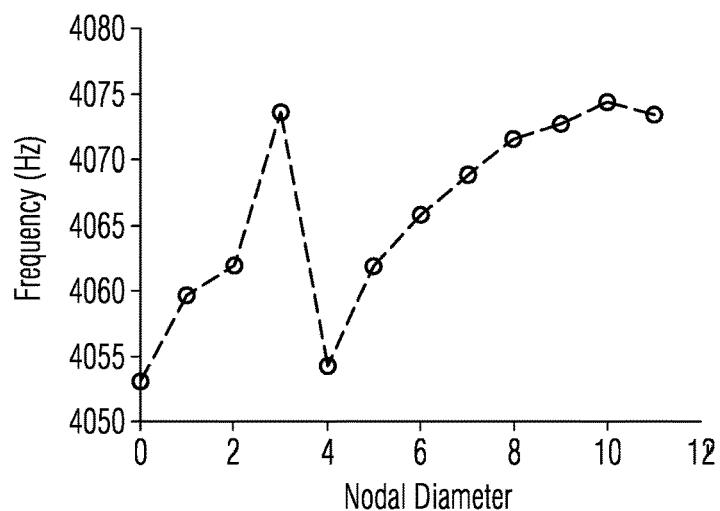
FIGS. 2A-2C illustrate parameters identified by analyzing the frequency response information of FIG. 1 with EzID software.
Figure 2B:
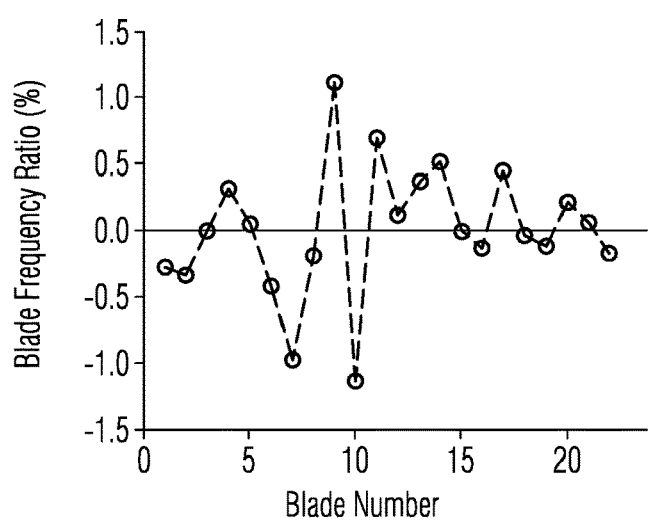
Figure 2C:
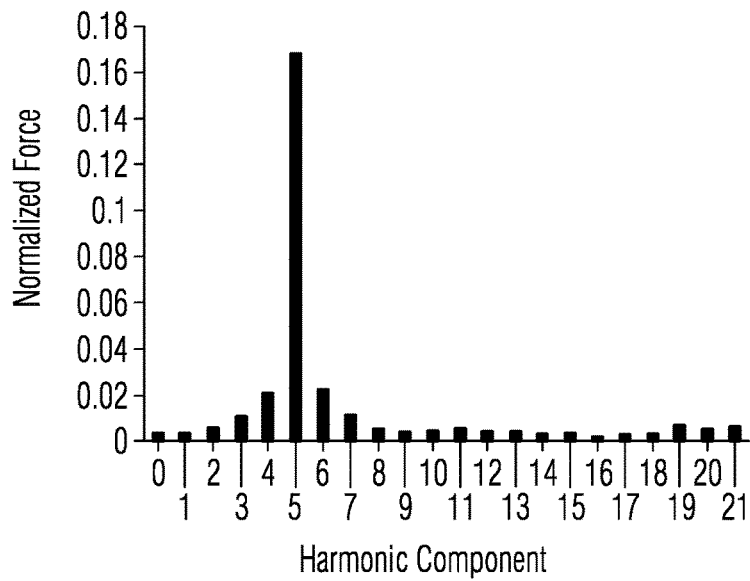
Figure 3:
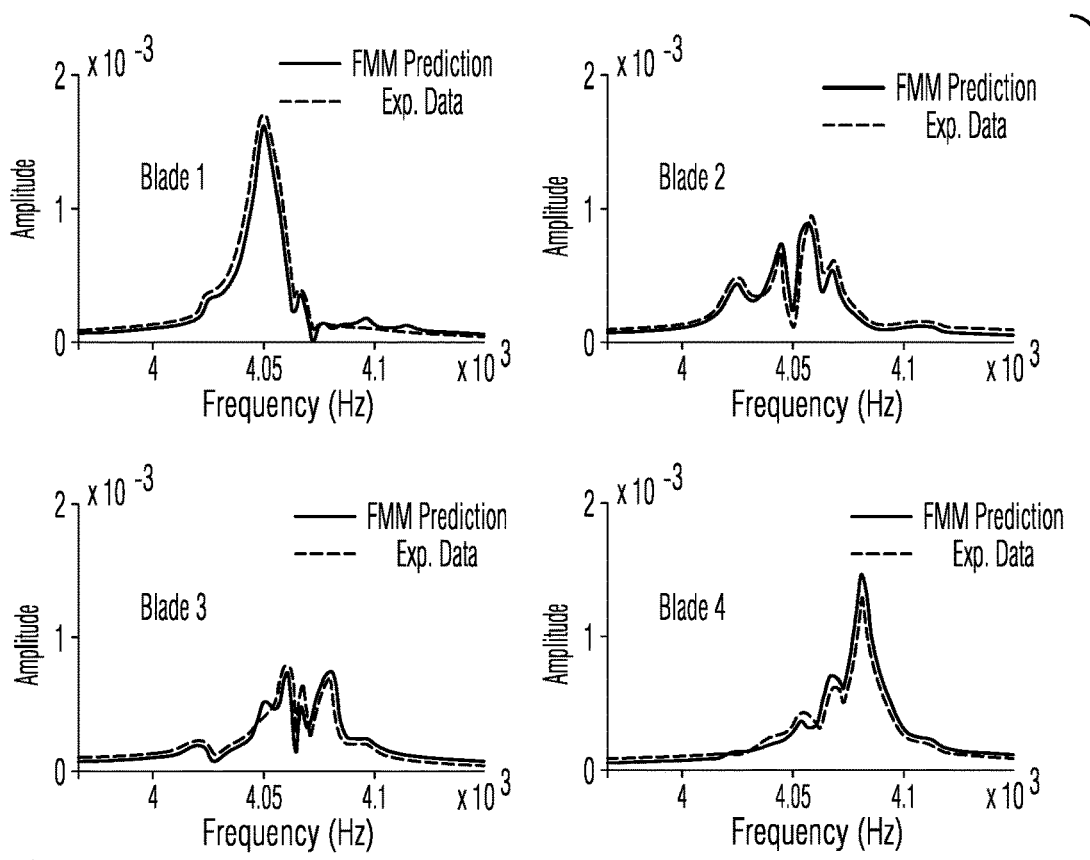
FIG. 3 illustrates consistency plots for four representative blades.

An initial step of embodiments of the present invention may include determining a vibratory DNA of an IBD. This may be done with a processor programmed to fit a reduced order model of a design of the IBD to vibration data taken as the IBD is excited by external mechanical forces. For example, the frequency response data of FIG. 1 may be used as input to computer software referred to by the trademark EzID that has been developed by Blade Diagnostics Corporation, assignee of the present invention. EzID software finds the parameters that best fit a Fundamental Mistuning Model (FMM) to the vibration data. EzID software identifies the following parameters:

1. Blade frequency ratios
2. Nodal diameter plot
3. Normalized forces acting on the blades
4. Damping ratio The values of the first three of these four parameters are shown in FIGS. 2A-2C for the vibration data of FIG. 1. In addition, the EzID software determined that the damping level in the vibration test corresponded to a damping ratio value of 0.08%. Once these parameters are identified, they can be plugged back into the FMM model to predict the frequency responses of the blades, and the predictions can be compared with the original experimental data of FIG. 1 to check the consistency of the reduced order model against the physical behavior of the bladed disk. These types of consistency plots are shown in FIG. 3 for four representative blades. In this case, the correlation between the frequency responses predicted by the FMM reduced order structural model and the experimental data is excellent. As a result, the parameters that were identified by fitting the reduced order structural model to the frequency response data are demonstrated to accurately characterize the vibratory state of this bladed disk in the $1^{st}$ torsion modes. The degree of correlation between the predicted and measured data may be evaluated by any known method and assigned a value, or may be assigned a relative value such as excellent/good/average/fair/poor, and further definition and use of the vibratory DNA may be predicated upon the achieved degree of correlation being deemed adequate for the application at hand.

Once these types of parameters are developed for an IBD, they can be used to define the vibratory DNA for the IBD. In an embodiment of the invention, two sets of parameters are selected from the FMM model that capture the inherent structural behavior of the bladed disk: the nodal diameter plot and the blade frequency ratios.

The nodal diameter plot gives the natural frequencies that the bladed disk would have if every blade were identical. Nodal diameter plots are often calculated by vibration engineers for new bladed disk designs by performing finite element analyses on a single, nominal sector model using cyclic symmetric boundary conditions. It is known that, if every blade were identical, the modes of a bladed disk would look like sine and cosine waves having a finite range of nodal diameters which are related to the phase constraint used in the cyclic symmetric model. As a result, the natural frequencies from a cyclic symmetric finite element analysis are often displayed in a nodal diameter plot as in FIG. 2A where the frequencies are plotted as a function of nodal diameter. EzID directly identifies the equivalent nodal diameter plot from the experimental data. As a result, the EzID generated nodal diameter plot characterizes the average behavior of the blades.

The second set of structural parameters that are useful as vibratory DNA are the blade frequency ratios. The blade frequency ratio is the percent deviation of a blade's frequency from the average of all of the blades on the rotor. Consequently, it is a measure of blade-to-blade variations. In the FMM model, it is the combination of the nodal diameter plot and blade frequency ratios that give the multi-peak curves seen in FIG. 3 and that capture the complex physical behavior seen in the experimental data. Consequently, these two sets of parameters, nodal diameter and blade frequency ratios, have been recognized by the present inventors as one embodiment of vibratory DNA to characterize the vibratory state of this bladed disk in the $1^{st}$ torsion modes.

It is noted that the other parameters identified with the EzID software characterize information about the vibration data that could change from one set of vibration data to the next, e.g. the harmonic content of the forces and the amount of damping. Thus, these parameters are not useful to define vibratory DNA, but they may be used along with the vibratory DNA for certain IBD life cycle management purposes, as will be discussed further herein.

The Value of Using a Reduced Order Model to Identify Vibratory DNA

In structural mechanics, a reduced order model is a simplified approach to modeling the vibratory response of a structure using a smaller number of degrees of freedom than a standard model used for design of the structure. The number of degrees of freedom in a formulation is the number of parameters needed to describe its physical state.

The standard method used by turbine manufacturers for calculating the vibratory response of turbine blades is the finite element method. A finite element model divides a blade into hundreds, thousands, tens of thousands or even more small elements. Commercial finite element programs sold under trademarks or trade names such as NASTRAN, ANSYS and ABAQUS have been developed and are widely used to model turbine components. These programs can automatically generate a finite element model of the component using as input a computer aided design (CAD) model that defines the geometry of the part. The physical location of each element is defined by the physical location of nodes. In addition, the motion of the element, the strain and the stresses of the material within each element are defined in terms of the motion of the nodes. Usually, each node has at least three degrees of freedom that define its location. So a rough estimate of the number of degrees of freedom in a finite element model of a structure is three times the number of nodes.

Typically, the more elements used in a finite element model, the more accurately it represents the physical behavior of the structure it models. In the case of vibratory response, it is desired to be able to calculate the natural frequencies and mode shapes of a blade. If more elements are used in representing the blade's geometry, then the finite element model calculates the frequencies of more modes within a certain accuracy. The accuracy that is needed depends upon the application. A fairly crude model may be adequate if it is only needed to determine the frequencies of the blade to within a couple of percent. However, if the goal is to predict how a full bladed disk would vibrate if the blades had slightly different frequencies (the mistuning problem), then a model of each blade that predicts its natural frequencies to within 0.1% is needed.

A study was done to determine how element size affects errors in predicting natural frequencies. In this study, a sequence of finite element models was created with different numbers of elements and was used to calculate natural frequencies for the twenty lowest frequency modes. The model with the coarsest mesh had 26,000 nodes. Examination of the results from the finite element analyses show that if it is desired to know the frequencies of only the first two modes within 0.1%, then the finite element model needs to have at least 60,000 nodes. Alternatively, if it is desired to know the frequencies of all twenty modes within 0.1%, then the model would have to have at least 140,000 nodes. Consequently, how many nodes and degrees of freedom that are needed in a finite element model depends upon the accuracy that is needed and the frequency of the mode you want to represent—the higher the frequency the more nodes are needed. If it were desired to construct a finite element model of a full bladed disk that has 50 blades, and if it were desired to use that model to calculate the modes of the system in which the blades vibrated in their $20^{th}$ blade mode, each blade would have to be represented by 140,000 nodes. Consequently, a finite element model of the full rotor with the fidelity required to do a mistuning analysis would require seven million nodes (50×140,000) to represent the blades. Since each node has three degrees of freedom, we can estimate that a finite element model with more than 20,000,000 degrees of freedom would be needed to calculate the mistuned response of the full bladed disk assembly up through the frequency of the $20^{th}$ blade mode. Consequently, for the purposes of accurately modeling the mistuned vibratory response of a full bladed disk, the number of degrees of freedom per blade for a representative finite element model would need to be in the range of hundreds of thousands of degrees of freedom per blade.

The number of degrees of freedom used in a reduced order model depends upon the number of modes it represents and the sophistication of the model. It is noted that a number of reduced order models are known in the art and could be used with the present invention. The original FMM model described above represents one isolated family of modes at a time. An isolated family of modes is a group of modes that have similar frequencies and that are separated from other mode families, such as by a kilohertz in one example. If there are N blades on the rotor, then there are N modes in an isolated family. An FMM model can use up to 6N parameters to completely define the vibratory state of a bladed disk for one isolated family of modes. Suppose there are M families of modes that it is desired to represent for a particular type of IBD. Then a total of 6 NM parameters are needed to represent the vibratory state of the IBD using FMM representations of the modes, i.e. you need 6 times the total number of modes. For example, if there are 20 mode families of interest for an IBD with 50 blades, FMM would need up to 300 parameters per mode family for a total of 6,000 parameters to completely define the twenty FMM models needed to represent the IBD's vibratory response. Six thousand parameters is a relatively small number compared with the number of parameters needed to define a full finite element model of the same IBD so that the finite element model accurately represents the IBD's mistuned vibratory response. For example, it is possible to compute the frequency responses of about 1,000 IBDs per second on a desktop computer using the FMM reduced order model, while it could take hours or even days to compute the frequency response of even one IBD with a finite element model of a full rotor that individually models the geometric variations in each blade.

There are more sophisticated reduced order structural models than the original FMM. For example, the assignee of the present invention has also developed an extension of FMM that simultaneously models two families of modes that interact, i.e. their natural frequencies overlap. In this case, the two family FMM model requires additional parameters to capture the interaction between the two families of modes. For this extended two family FMM model, the total number of parameters needed to represent the vibratory state of the modes is equal to 10 times the number of modes being represented by the model. Thus, the present inventors define the term "reduced order model" as used herein so that it allows for further improvements in the sophistication of the models that are used to represent the vibratory response of a bladed disk. Consequently, a "reduced order model" is defined here as one in which the number of parameters used to define the vibratory response is less than 100 times the number of modes being represented. This is significantly more than the number of parameters being used in current reduced order models of IBDs, but more than an order of magnitude less than the number of parameters that are needed if a finite element model of the bladed disk were used that accurately modelled the vibratory response of the full, mistuned bladed disk.

Inherent in this definition of a reduced order model of an IBD is the concept that the vibratory responses of the blades are coupled and must be analyzed as a system. As a result, elementary models that represent the vibratory response of only a single, uncoupled blade are not included in this definition of a reduced order structural model of the bladed disk. An example of such an elementary model is a simple mass/spring/dashpot system. The shortcoming of such a simple model is that it only has one peak frequency response, and it cannot represent the more complex, multiple peak frequency responses that are measured in real IBDs as illustrated in FIG. 1.

The present inventors have recognized that defining vibratory DNA with a relatively small number of physically meaningful parameters has important implications for blade life cycle management:

1) It is possible to manipulate the equations that govern the vibratory response of the reduced order model to get them in a form that can be used for identification purposes. As a result, instead of using the vibratory DNA parameters in the reduced order model as input and computing the vibratory response, it is possible to use the vibratory response data as input and to compute the values of the vibratory DNA. This is not possible with a full finite element model.

2) As a result of 1) above, the hundreds of megabytes of vibration data that are measured during a vibration test of a bladed disk can be reduced to a few hundred kilobytes of essential information.

3) The vibratory DNA information can be kept in a searchable database. As a result, it is possible to determine which bladed disks would have similar vibratory response to similar conditions. This could be important if a bladed disk were to fail from high cycle fatigue and it became necessary to identify bladed disks in the fleet that have a higher risk of failure.

Consequently, an embodiment of this invention includes defining vibratory DNA by determining the parameters that best fit a reduced order structural model to the frequency response of a bladed disk, and to store those parameters in a searchable database for purposes such as quality control, health monitoring, tracking the properties of an aging fleet, and monitoring repair processes. If a bladed disk were to fail from high cycle fatigue, then the vibratory DNA could be used to help establish the root cause of the failure. In addition, the vibratory DNA could be used to find at-risk parts and to optimally manage a fleet of similar parts.

An Embodiment of the Invention

One embodiment of the invention involves the following steps:
1. Measuring the vibratory response of the IBD over an interval of time. This involves measuring the vibratory response of at least one point on each blade. Additional vibration measurements at other points on the blades or on the disk may also be required depending on the complexity of the reduced order structural model.
2. Processing the vibration data to extract the frequency response associated with each measurement point.
3. Determining the vibratory DNA of the IBD by finding the parameters that best fit a reduced order structural model to the frequency response data.
4. Verifying that the vibratory response predicted by the vibratory DNA accurately represents the vibratory response of the IBD within a desired degree of correlation, such as a 95% or 98% correlation as examples. If not, a revised structural model is needed.
5. Repeating steps above for all of the important vibrational modes of the IBD.
6. Storing the vibratory DNA parameters in a searchable data base.
7. Repeating steps 1 through 6 as necessary at regular intervals to track changes in the vibratory DNA of the IBD as it ages caused by wear, foreign object damage, repairs, etc.
8. Accessing the data and using it to compare IBDs or groups of IBDs. The comparisons may be performed by executing instructions on a processor and may be based on a comparison to established predetermined values (such as design values), or a comparison to stored vibratory DNA of other IBDs or of the same IBD at an earlier time such as prior to a period of operation in a rotary machine, or may be based on using the stored vibratory DNA in a reduced order model to predict the vibratory response of the IBD and then comparing the vibratory response. The predictions of this step can be for conditions that are different from those in step 1 above.
9. Assigning an IBD to one of at least two groups in response to a value of its vibratory DNA, and performing a physical activity affecting the IBD based upon its group. For example, an IBD may be grouped as acceptable for operation in a rotary machine, or as requiring further evaluation and/or modification prior to operation in a rotary engine. Other group-dependent physical activities may include: removing an IBD from operation in a rotary machine; performing a repair of operational damage to an IBD; performing a modification of an IBD; and/or performing a service activity on a schedule prioritized based on category.

Virtual Engine Testing

Qualification of a design of an IBD may include full scale engine testing wherein an IBD is exposed to actual engine operating conditions. Engine testing of an IBD is expensive, and real time data acquisition is made difficult due to the harsh environmental conditions and limited physical access within the engine. And while every IBD is different within the range of various manufacturing tolerances and will exhibit different vibrational responses, it is not practical to engine test every IBD in a fleet. So there remains a degree of uncertainty of whether any particular IBD of a fleet will experience a blade mistuning problem when exposed to the actual operating conditions in an engine.

The present inventors have recognized that it is now possible to utilize a combination of engine and bench tests with the vibratory DNA of the IBDs to reduce the uncertainty of performance of a fleet of IBDs. Bench testing of an IBD is not only less expensive than engine testing, but it is also possible to obtain information from bench tests that cannot be determined in the engine test due to engine testing limitations. In a bench test it is possible to measure as many points as desired on each blade to identify and to differentiate neighboring families of vibration modes. Furthermore, bench test data tends to be cleaner than actual engine operational data, thus providing much improved frequency resolution. Bench testing of an IBD prior to engine testing that IBD provides additional advantages. The bench test data can be used to develop the vibratory DNA of the IBD, and then the vibratory DNA can be used with the actual engine test data to characterize the engine operating conditions, for example to back calculate the engine forces, engine damping levels, and centrifugal effects. Once the engine operating conditions are characterized, it is possible to assess how other IBDs would respond in the engine without performing additional engine tests. This is accomplished by bench testing the other IBDs, using the bench test vibration data to develop the vibratory DNA of each IBD, then using the engine forces, damping and centrifugal effects to predict what the vibratory response of each IBD would be if tested in the engine. As a result, the bench tests become virtual engine tests.

Furthermore, this process may be used to perform a virtual engine test of a modified or repaired IBD prior to installing it into an engine, or to predict the vibratory performance of an IBD to a changed engine operating condition. For example, the original engine test may have been performed in an engine with 24 inlet guide vanes, and it may later be desired to modify the engine to instead have 30 inlet guide vanes. The predicted changes to the engine operating conditions may be used with the vibratory DNA of each IBD to predict the impact of this engine change on the fleet. When a first engine is actually modified, an actual engine test can be performed and used with the IBD vibratory DNA to back calculate the actual revised engine operating conditions for comparison with the predicted engine operating conditions. Consequently, the present invention makes both engine and bench test vibration measurement data significantly more general and valuable.

Manufacturing Application of the Invention

As discussed above, the vibration characteristics of turbine blades are very important because the blades in an engine are subjected to high vibratory loads and can fail from high cycle fatigue. Representative parts are tested during the engine development process to measure the vibratory response of the blades and to determine if there is a risk of blade failure from high cycle fatigue. The vibratory amplitudes of the blades can change significantly from even small changes in the blades' frequencies. Consequently, it is important for the engine manufacturer and end user to know that the bladed disks that are being manufactured when the engine is in production have essentially the same vibration characteristics as the IBDs used in the engine qualification tests in order to provide a level of assurance that the production IBDs will have acceptable levels of vibratory response when used in an engine. The approach described in this invention provides a simple method for addressing that issue.

Figure 4:
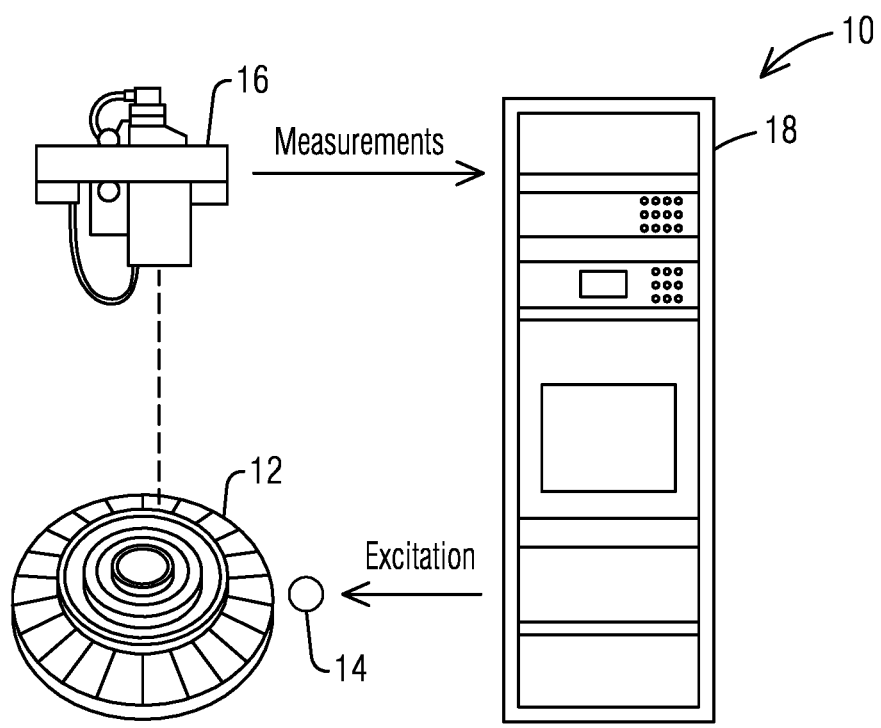
FIG. 4 is a schematic illustration of a vibration test apparatus for IBD's.

The assignee of the present invention makes a test apparatus 10, illustrated schematically in FIG. 4, for measuring the vibratory response of an IBD 12 to engine-type traveling wave excitations, and to produce vibration data during test excitation of the IBD 12. The primary components of the test apparatus 10 include a plurality of acoustic drivers (speakers) 14 or other known mechanism for providing the excitement energy, and a scanning laser vibrometer 16 or other known device for measuring deflection of the IBD 12 in response to the excitement energy. A controller or processor 18 is associated with the test apparatus 10 for controlling the test and gathering data. The voltage inputs to the drivers 14 are phased so that the forces exerted on the blades of the IBD 12 form a backward traveling wave similar to what it would experience in a turbine engine during engine acceleration or deceleration. The vibratory response of a blade is measured using the scanning laser vibrometer 16. The excitation and measurement are repeated until the vibratory responses of all of the blades are measured and vibration data similar to that shown in FIG. 1 is produced. The vibration data may then be analyzed on the processor 18 or elsewhere with the EzID software or a similar product to identify parameters useful for defining a vibratory DNA of the tested IBD 12. As a check on the EzID analysis, the vibratory DNA parameters may then be used to generate predicted vibration data, such as described relative to FIG. 3, to confirm the accuracy of the reduced order model used with the EzID software and the associated vibratory DNA values. The vibratory DNA data for a plurality of IBDs in a fleet of IBDs manufactured to the same design may be compared, such as in FIG. 5 which shows the nodal diameter plot 20 for the tested IBD 12 as well as the nodal diameter plots for all of the other IBDs tested. It is clear from FIG. 5 that the tested IBD 12 has unusually high average frequencies and has a somewhat different nodal diameter shape when compared to a majority of the fleet of IBDs. As part of the vibratory DNA of the IBD 12, this difference in the shape of the nodal diameter plot can strongly affect its vibratory response. Consequently, if IBD 12 were to subsequently fail from high cycle fatigue, then knowing the vibratory DNA could be an important factor in understanding the underlying, root cause of the failure. Advantageously, prior to any failure, IBD 12 and other IBDs with similar outlying vibratory DNA parameters (such as the top two or five lines in FIG. 5) may be categorized differently from other IBDs of the fleet with regard to various life cycle management activities, such as inspections or engine operating parameter limitations. Alternatively, the outlying IBDs could be modified to bring their vibratory DNA more in line with other IBDs of the fleet.

Figure 5:
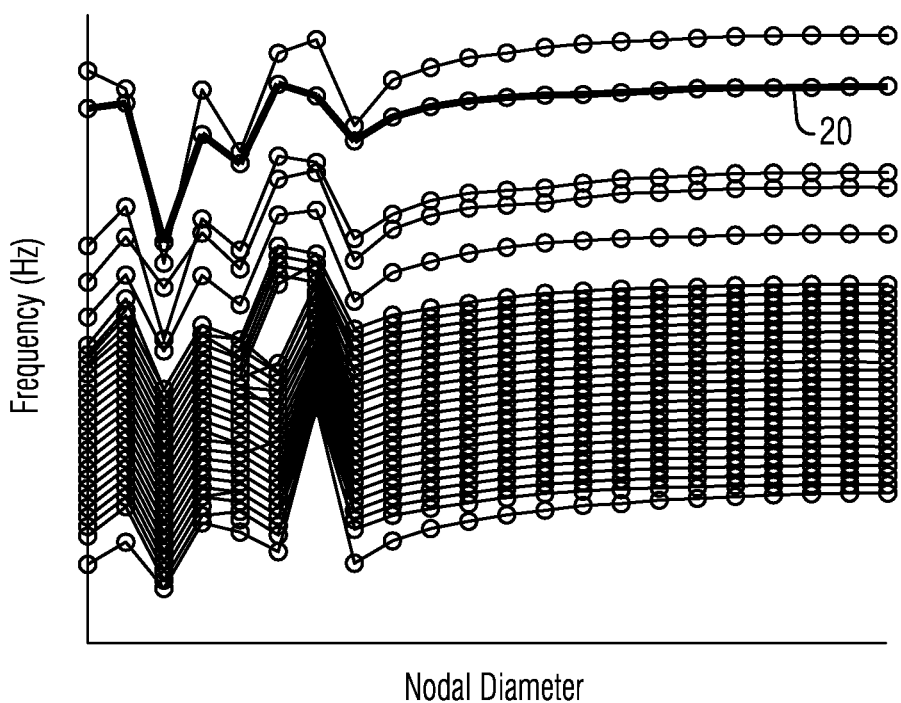
FIG. 5 illustrates nodal diameter plots for a plurality of IBDs of the same design.

The data of FIG. 5 (and/or other parameters indicative of vibratory DNA) may be compared to theoretical values calculated using a finite element model during the design of the IBD as a further confirmation of the consistency of the design and manufacturing processes.

FIG. 6 shows the blade frequency ratios for the blades of the tested IBD 12 as a function of the blade's position on the disk. Notice that blade 8 has the lowest frequency and that the frequencies of the blades tend to increase as you progress circumferentially around the IBD. This may be indicative of the manufacturing process wherein blade 8 was likely the first blade machined, then blade 9, blade 10, etc. Because of tool wear during the machining operation, the blades tended to get progressively thicker and the frequencies progressively higher. Consequently, this type of frequency information can provide insight into the consistency of the manufacturing process and can be used for quality control.

FIG. 7 shows the statistical distribution of the blade frequency ratios of the tested IBD 12 compared with the statistical distribution of the blade frequency ratios measured on other IBDs of the fleet.

Figure 8B:
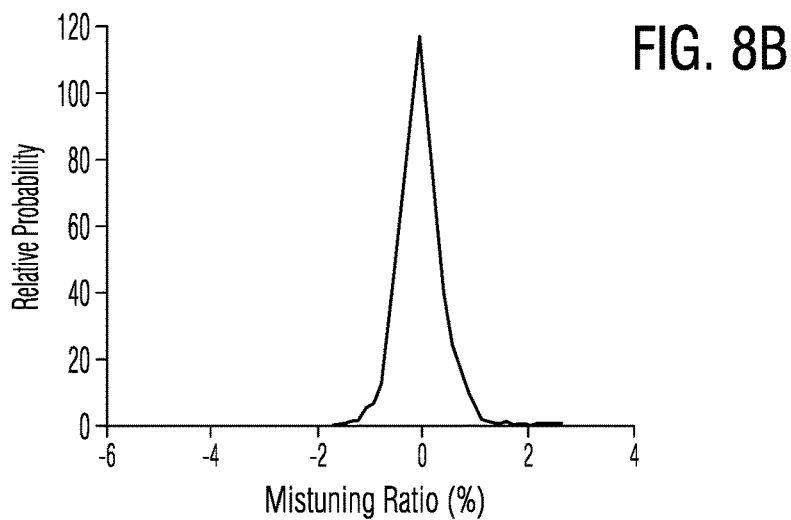
Figure 8C:
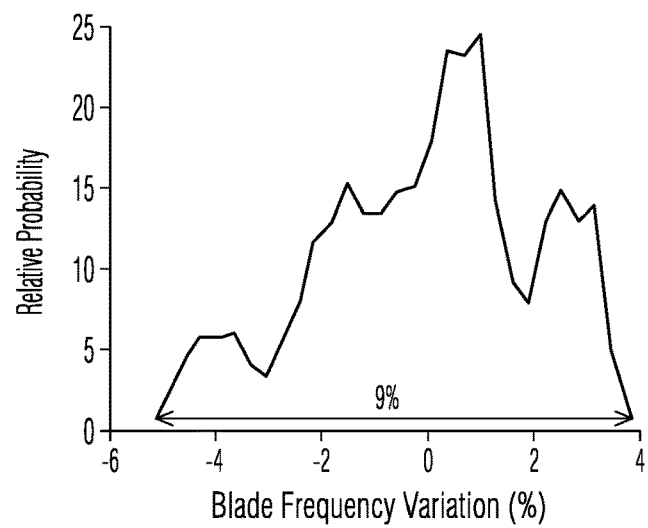

Lastly, the information in FIGS. 6 and 7 can be combined to determine the total variations in blade frequencies, as shown in FIGS. 8A-8C. If the variation in the average frequencies of the blades from one IBD to the next (FIG. 8A) is combined with the blade-to-blade variations in their frequency ratios (FIG. 8B), it is found that the blade frequencies can vary as much as 9% in this family of modes (FIG. 8C). It is important to know this spread in frequencies since a large frequency variation can move a mode from above the operating range of the engine to inside the operating range where a blade could be excited at a max power condition.

Consequently, similarly defined vibratory DNA can be accumulated for a number of parts of the same design to form a baseline data set that characterizes the manufacturing process used in producing those parts. This type of information could be used for quality control purposes to monitor changes over time caused by variations in the manufacturing process or by changes associated with an aging fleet. Moreover, a specific part can be compared with the baseline data to determine if the part has unusual vibration characteristics. This could be important, for example, in monitoring a new manufacturing or repair process.

Repair Application of the Invention

When a turbine blade is mildly damaged during operation in the turbine engine, such as by experiencing leading edge impact damage, it is a common practice to smooth and blend the edges of the damaged area by grinding in order to eliminate any stress riser locations, then to return the blade to service provided that the amount of blending does not exceed a predetermined limit set by the manufacturer. The blending limits are typically tight and are not blade specific, and they do not consider the interaction of the blades on an IBD. The lack of ability to perform more aggressive blending often leads to the disposal of an IBD or it necessitates an expensive weld repair procedure to restore the damaged area back to its original geometry.

Figure 9A:
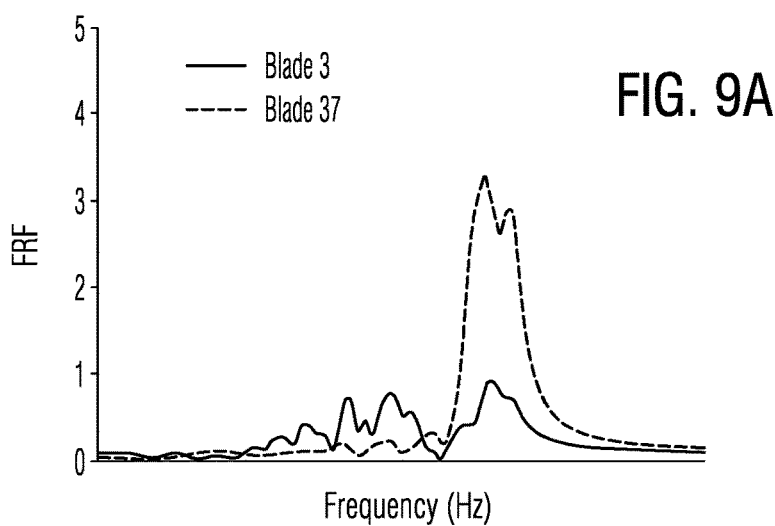
FIGS. 9A and 9B illustrate the effect of a mechanical modification on blade frequency responses.
Figures 9B, 10:
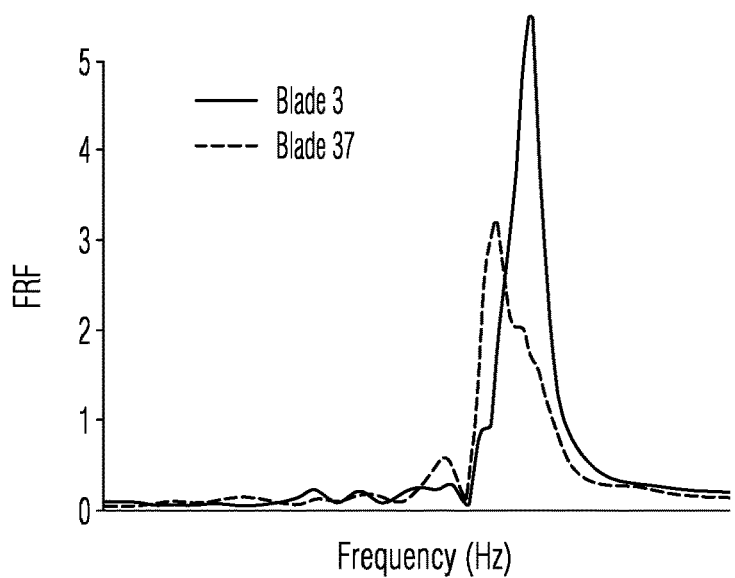
FIG. 10 is a table of the probabilities of the existence of a tuned absorber in a fleet of IBDs.

FIGS. 9A and 9B illustrate the sensitivity of an IBD to small mechanical modifications of a blade. The frequency responses of the blades of an IBD were measured in a test apparatus as illustrated in FIG. 4 and the results for two particular blades are shown in FIG. 9A. Blade 37 is illustrated because it demonstrates the highest vibration amplitude of all the blades of the IBD, and blade 3 is also highlighted for further discussion below. Following the test of FIG. 9A, a small portion of the tip of blade 3 was removed to simulate a common repair technique used when a blade tip is damaged during operation. The IBD was then re-tested in the test apparatus using the same test conditions, and the resulting frequency responses of these two blades are shown in FIG. 9B. In this case, clipping of the tip of blade 3 raised that blade's frequency and caused its amplitude to increase by about a factor of five. Moreover, the peak amplitude of the response of blade 37 was slightly reduced, and its overall response shape changed somewhat. All of the other blades of the IBD (not illustrated) were affected to some degree in both shape and peak amplitude.

Some blends, like the example above, can significantly increase the vibratory response of a bladed disk, while others may result in minimal change or even a decrease in vibratory response. A properly defined vibratory DNA will distinguish the vibrational impact of any physical service action such as a weld repair, modification, blending, grinding, or coating, or a change in the physical operating conditions of the engine which result in a change in the driving forces exerted on the IBD. The present invention allows the response of the modified IBD to be predicted for the same or different engine operating conditions. Consequently, this example demonstrates both the sensitivity of the vibratory response of an IBD to small mechanical changes and the importance of monitoring the IBD's vibratory DNA following a repair process. Accordingly, vibratory DNA can be used to confirm the acceptability of a non-qualified repair procedure for a specific IBD, or it may be used as part of the qualification of a repair technique for a fleet of IBDs. This may be accomplished by determining the post-repair vibratory DNA of the subject IBD, and comparing the post-repair vibratory DNA to a predetermined criteria, or to fleet IBD vibratory DNA contained in a database, or to vibratory DNA of the IBD from a prior time, such as the as-manufactured vibratory DNA or the vibratory DNA from prior to a period of operation in the rotary machine.

The Database

Establishing a Database

The vibratory responses of a number of IBDs of a particular type (engine and stage) can be measured during the manufacturing process or during operation in an engine or when the engines are shut down for maintenance. The amount of data measured in a typical test is fairly large, e.g. 250 megabytes, and is almost impossible to search. However, once vibratory DNA is defined and extracted from the vibration data, the amount of information is relatively small (a few hundred kilobytes) and can be readily searched and characterized.

Utilizing the EzID software, the vibratory DNA for an IBD having 42 blades requires about 15 KB of data for one vibration mode family. The storage requirement is proportional to the number of blades and to the number of modes, so the storage requirement for ten modes for this IBD would be 150 kB, and for an IBD having 84 blades it would be 300 kB. A more sophisticated reduced order model may generate vibratory DNA requiring more data, perhaps as much as five times more data for some models. For most purposes for most IBDs, the vibrational DNA may be defined using less than 1 MB of data. And even using 20 vibration modes for an IBD having 120 blades using a very complex reduced order model, less than 10 MB of data is required for vibration DNA to uniquely characterize the vibratory state of the IBD.

This information can then be used for a number of different purposes, and depending on the purpose, a number of different metrics could be used to compare IBDs.

Example 1: Comparing IBDs Manufactured by Different Processes

It is important for a manufacturer to know that IBDs produced at a new facility and/or with a different process have essentially the same vibration characteristics as those produced during the original development process. This purpose can be accomplished by defining and using a vibratory DNA that includes nodal diameter plots and blade frequency ratios.

The frequencies in the nodal diameter map (such as FIG. 2A) are the natural frequencies that the IBD would have if all of the blades were identical to an average blade. Consequently, variations in the nodal diameter plots characterize IBD to IBD variations. In this example, the EzID software is used to extract the nodal diameter plots of a sample group of IBDs that were manufactured using a particular process. If another IBD is manufactured at a different facility, it could be tested and its nodal diameter plot directly compared with the nodal diameter plots of the sample group IBDs in the baseline data set, in the manner illustrated in FIG. 5. Alternatively, it is possible to normalize each set of nodal diameter plots by dividing the frequencies in the nodal diameter plot by the frequency of the highest nodal diameter component, and then to compare the degree of variations in the shapes of the nodal diameter plots for the two manufacturing processes as well as the mean and standard deviation in frequencies used to normalize the data.

In addition to assessing IBD to IBD variations by comparing nodal diameter information, it is also important to assess blade to blade variations. This can be done, for example, by performing standard statistical tests to determine if the standard deviations in the blade frequency ratios are significantly different.

What this example illustrates is that if it is desired to use the database for quality control of the manufacturing process, then the metrics used would probably be a direct comparison of the sets of vibratory DNA parameters; i.e. how similar are the nodal diameter plots and the distribution of blade frequency ratios from the two manufacturing processes.

Example 2: Evaluating the Fleet Risk from a Tuned Absorber

Another application of the use of vibratory DNA is to assess the risk that any IBD from a fleet will have a tuned absorber problem. A tuned absorber problem is a phenomenon where a small number of blades on the IBD vibrate significantly more than the others. Since the vibratory energy becomes focused on just a few blades, those blades can experience high stresses and have a significantly shorter high cycle fatigue life.

In this example, twenty IBDs of a fleet were tested, and the vibratory DNA stored in the database included nodal diameter plots and blade frequency ratios for eight different mode families for each IBD. A Monte Carlo simulation was then performed to calculate the vibratory response of approximately 1000 simulated IBDs. Each simulated IBD was constructed by assigning it tuned frequencies and mistuning that came from the statistical distribution of vibratory DNA value observed in the library. The process began by simulating each IBD's mode 1 response to a OND excitation, and recording the peak amplitude of each blade. The peak amplitudes of each IBD where then evaluated to determine if it exhibited tuned absorber behavior. For the purposes of this study, a rotor with a maximum responding blade amplitude that was greater than 4 times the average peak amplitude for that rotor was classified as a tuned absorber, although another multiplier or other criteria could be used in other examples. The percentage of simulated IBDs that were found to be tuned absorbers was then recorded. This process was repeated for all 8 modes and for 19 different engine order excitations (0-18), and the results tabulated in FIG. 10, which shows the likelihood that any IBD in the fleet will have a tuned absorber problem in a given mode when driven by a given engine order. The information in FIG. 10 can be combined with information about which modes and engine orders are strongly excited in the engine to generate an overall risk of a blade failure occurring from high cycle fatigue.

What this example shows is that the vibratory DNA information in the database can be used with a reduced order model prediction algorithm, such as FMM, to compare IBDs based on how they would vibrate under various conditions. Since the FMM vibration prediction algorithm is so fast, it is possible to compute the vibratory response of every IBD in the database in a few seconds to any engine order excitation—even engine orders that were not originally tested. This is important since it is usually not known which engine order may cause a blade failure in the engine until a blade does fail, and such a failure may not occur until the engines have been operated for a number of years. Consequently, using the vibratory DNA information in this manner makes the original vibration test data much more valuable, i.e. for the cost of performing a vibration test with only one engine order excitation, it is possible to calculate how the IBD will respond to any engine order excitation.

Alternative Vibratory DNA Parameters

The vibratory DNA parameters defined for a particular application must be capable of distinguishing between different IBDs to a level of accuracy sufficient to achieve the goals of the particular application. Embodiments above have described the use of nodal diameters and blade frequency ratios as vibratory DNA parameters. The present inventors have found that for some IBD designs, the vibratory DNA calculated using the standard N modes (where N is the number of blades) does not provide a sufficiently good correlation between the measured vibration data and the calculated vibration data (see FIG. 3). The assignee of the present invention has developed an advanced version of their FMM/EzID software that includes the standard N modes (where N is the number of blades) plus one additional pair of modes. That proprietary prediction software is called FMM+ and the corresponding identification software is called EzID+, and it is useful to define vibratory DNA when the nodal diameter plot has an additional pair of modes that are sufficiently close in frequency that they interact with the family of blade modes. Surprisingly, the present inventors have found that the vibratory DNA parameters (not just the value of those parameters) may need to be different from IBD to IBD within a fleet of IBD's of the same design due to differences caused by manufacturing tolerances. For example, it is known that machining tolerances affecting blade dimensions and can cause mistuning of the blades. However, the present inventors have discovered that normal machining tolerances for a feature machined into a disk may also result in a mistuning effect as the blades and disk interact during vibration. It has been discovered that small manufacturing variations can move a disk mode into or out of an interaction with a family of blade modes. For some IBDs of a fleet, these interactions may be insignificant and need not be reflected in the vibratory DNA, while in other IBDs of the fleet, these interactions may be significant, even limiting, and therefore need to be reflected in the vibratory DNA of those IBDs. Standard blade tip timing testing does not provide data sufficient to reliably detect such effects, but the inventors have found that by measuring disk vibration along with blade vibration during bench testing of an IBD in a test apparatus such as in FIG. 4, it is possible to determine vibratory DNA which accurately characterizes such interaction.

Figure 11:
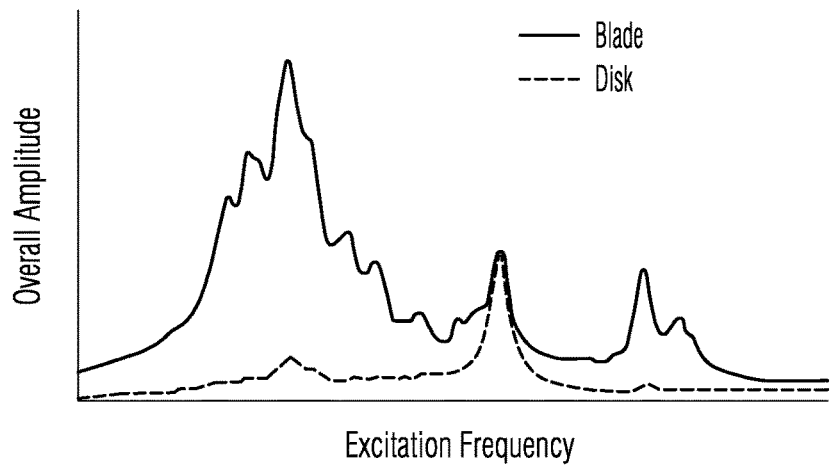
FIG. 11 illustrates interaction between the blades and disk of an IBD.

For example, the EzID+ software was used to analyze the vibratory response of an IBD in which a structural feature on the disk of the IBD had a resonant frequency that was very close to the frequencies of the blades in a particular family of modes. As a result, the blades and disk feature interact. An example of the vibratory responses of the blades and disk feature are shown in FIG. 11. The term "overall amplitude" used in this figure means the square root of the sum of the squares of the individual blade and individual disk feature measurements. Note that the disk feature has a peak at a frequency close to a frequency where the blades have a peak, and therefore they can interact in a complex way.

Figure 12:
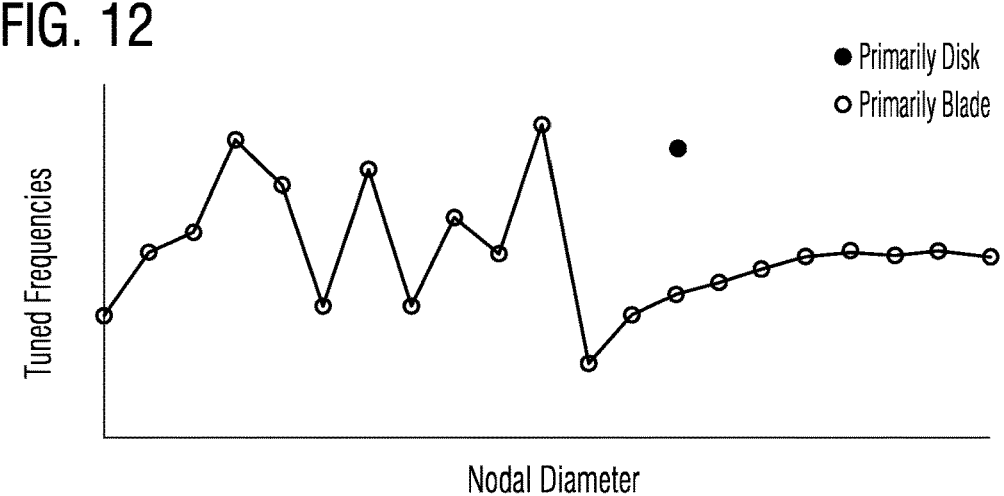
FIG. 12 illustrates coupling between blades and disk in a nodal diameter plot.

When the frequency response data is processed with the EzID+ software, it identifies a nodal diameter plot for the system, FIG. 12. Note that EzID+ identifies an additional tuned frequency for one of the nodal diameters. Consequently, there are two frequencies for the same nodal diameter that tend to interact and transfer energy between the blades and the disk feature. In addition, to identifying the nodal diameter plot, EzID+ identifies the amount of coupling that occurs between the blades and the disk feature in each of these tuned modes. All of this information, as well as information about blade to blade frequency variations, may be used as vibratory DNA to characterize the vibratory state of the IBD in these modes.

Figure 13:
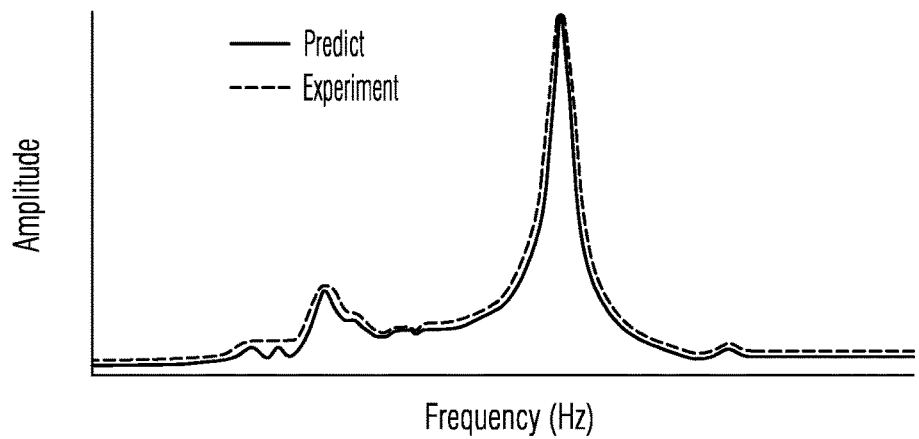
FIG. 13 illustrates a consistency between measured and predicted frequencies.

If a normal N mode model were used to define the vibratory DNA of this IBD, there would be an unacceptably low degree of correlation between measured and predicted vibration data. However, if vibration data for both the blades and disk of this IBD are measured during the excitation of this IBD in a test apparatus, that data can be used with EzID+ to identify the vibratory DNA, and those parameters can be used as input in an FMM+ model to predict the vibratory response of the IBD, and that prediction compared to the actual frequency response data has a significantly improved correlation as shown in FIG. 13. The curves are nearly indistinguishable in this example, indicating that the vibratory DNA defined from the FMM+ model parameters reflecting the interaction of the blades and disk precisely defines the vibratory state of the IBD in these modes. It is therefore appreciated that, due to the interaction of blades and disk, the parameters used to define vibratory DNA may not just be different from IBD to IBD, but also may be different from mode family to mode family. One would expect that as reduced order models continue to evolve to capture additional physical behavior, other embodiments of vibratory DNA may be defined for other particular applications.

Long Term Blade Health Monitoring

The following example illustrates the application of vibratory DNA for monitoring the long term operation of a rotary machine.

Figure 14:
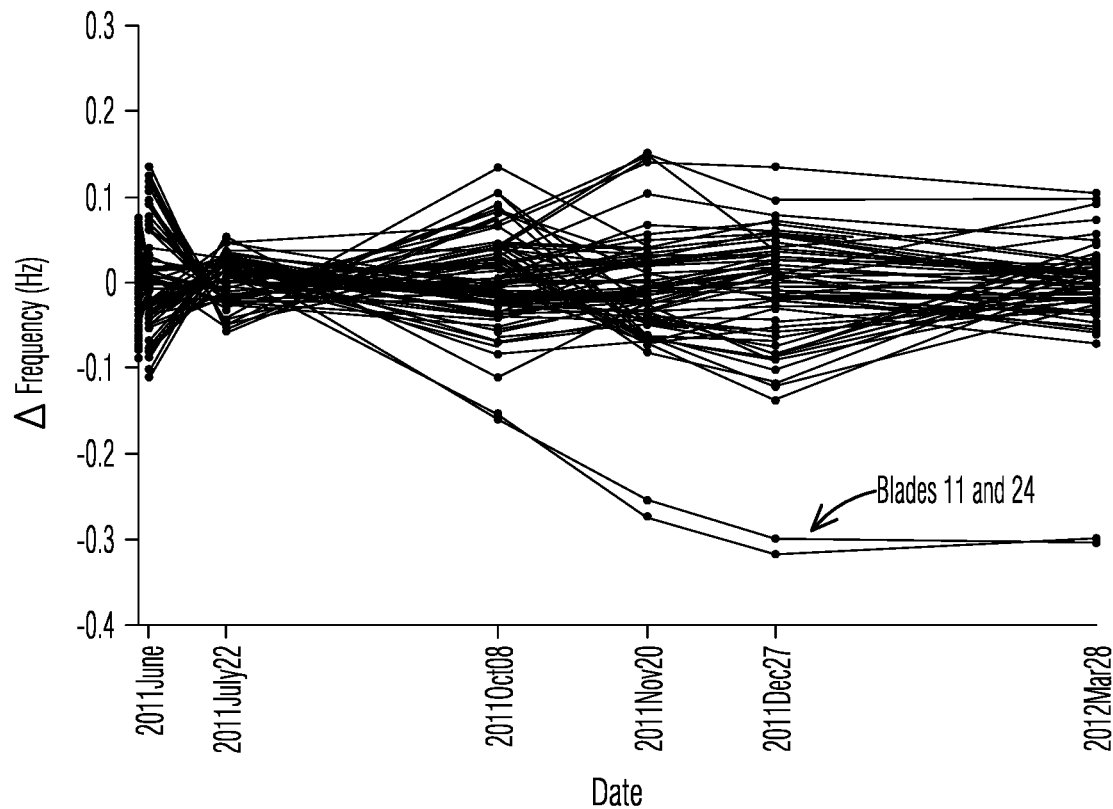
FIG. 14 illustrates the change in blade frequency ratios as a function of time for two blades containing cracks.

Vibration data from a steam turbine machine collected over a series of dates was analyzed. A change in the frequency ratio of each blade was calculated for each date by subtracting the new values of blade frequency ratios from a baseline set of blade frequency ratios. The results were multiplied by the nominal blade frequency to convert the changes in frequency ratios to changes in the blades' frequencies. The resulting values are shown in FIG. 14. It was anticipated by the present inventors that changes in the blade frequencies that are larger than a level established for random noise are indicative of changes in the physical state of the blades and may be indicative of degradation of the blades (cracks).

It is clear from FIG. 14 that the random noise in the measurement process is about 0.1 Hz. It is also clear that after October 2011, blades 11 and 24 show a clear and consistent trend of lowering frequencies. Consequently, the data depicted in FIG. 14 is strongly indicative that blades 11 and 24 have changed their physical state. Thus, the engine containing these blades may be considered for a maintenance activity, such as shutdown and inspection) at a higher priority than other engines in the fleet not exhibiting such a changing blade response.

It was later confirmed by physical inspection that blades 11 and 24 were the only blades that had cracks of a significant size (cracks in a few other blades were about 10 times smaller). Blades 11 and 24 were destructively examined so that the size of the cracks could be measured. Both blades had similar cracks. It was found that the cracks in blades 11 and 24 were small compared to the size of a crack that would cause a blade to fail catastrophically, thus demonstrating that the inventive method is effective to identify discontinuities in a blade before such discontinuities present a risk of imminent blade separation. Because the inspections can be done while the turbine is in operation, even operation at a constant speed, it can be done at regular intervals. Because the method can detect relatively small cracks, it is feasible to look at data over a number of inspections and confirm that a change is, in fact, a trend and not noise. Thus, the procedure not only provides a sensitive method for detecting blade damage, it also provides an approach that is unlikely to produce false positives, i.e. unlikely to determine that a blade has damage when, in fact, the blade is undamaged.

Blade health can also be assessed conveniently using vibratory DNA when a rotary engine is disassembled for inspection and maintenance, as is commonly done with gas turbine engines. Once an IBD is removed from the engine, it can be tested in a test apparatus 10 such as illustrated in FIG. 4, which can be located at the engine disassembly location. The vibration data collected during the test is then analyzed promptly, either remotely or locally on the processor 18 using software such as EzID to identify the post-operation vibratory DNA of the IBD. Changes in vibration DNA over time will reflect both single blade issues such as cracking (mistuned ratio) and general erosion/wear issues (nodal diameter plot). The post-operation vibratory DNA may be compared to a predetermined acceptance criteria, or to vibratory DNA stored in a local or remote database, or to vibratory DNA of the same IBD obtained at an earlier point in time, and the IBD can be assigned to one of at least two categories based upon such comparison. Moreover, the post-operation vibratory DNA may be used with reduced order model software to evaluate whether the IBD has developed any tuned absorber or exhibits a high max/mean vibratory response in any mode as a result of physical changes induced in the IBD by operation in the engine. All such evaluations may be executed on a local or remote processor. In one embodiment, the test apparatus 10 and processor 18 may have full local capability for testing and evaluating the IBD and for displaying an output indicative of a pass/fail condition of the IBD via an output device operatively connected to the processor, such as a printer, screen, indicator light(s), another processor, etc. This would allow a local technician having a relatively low level of training to determine whether the IBD is assigned to one group deemed fit for reinstallation and continued use in the engine, or whether the IBD is assigned to another group for further evaluation and/or possible repair before reuse or for possible discarding. The local testing may be done before and/or after any cleaning and/or blending operation performed on the IBD, which may also be performed at the engine disassembly location, thereby expediting the overall engine maintenance schedule and minimizing the cost and risk of transporting the IBD.

Blade Failure Analysis and Corrective Action

If an IBD fails, the first goal is to determine the root cause of the failure. An inspection of the failed IBD will reveal the location where the crack initiated. Typically, the crack location can be used to narrow the focus on which modes might have caused the failure, i.e. the mode that caused the failure is likely one that would have high vibratory stress in the failure location. Vibration modes are excited by specific engine order excitations in the engine. If test apparatus data is available for the IBD, it is possible to look at the vibration data for those modes and engine orders to see if the failed blade had unusually high vibratory response. If so, it is likely that the IBD failed because a particular mode family was excited by a particular engine order driver.

Figure 15:
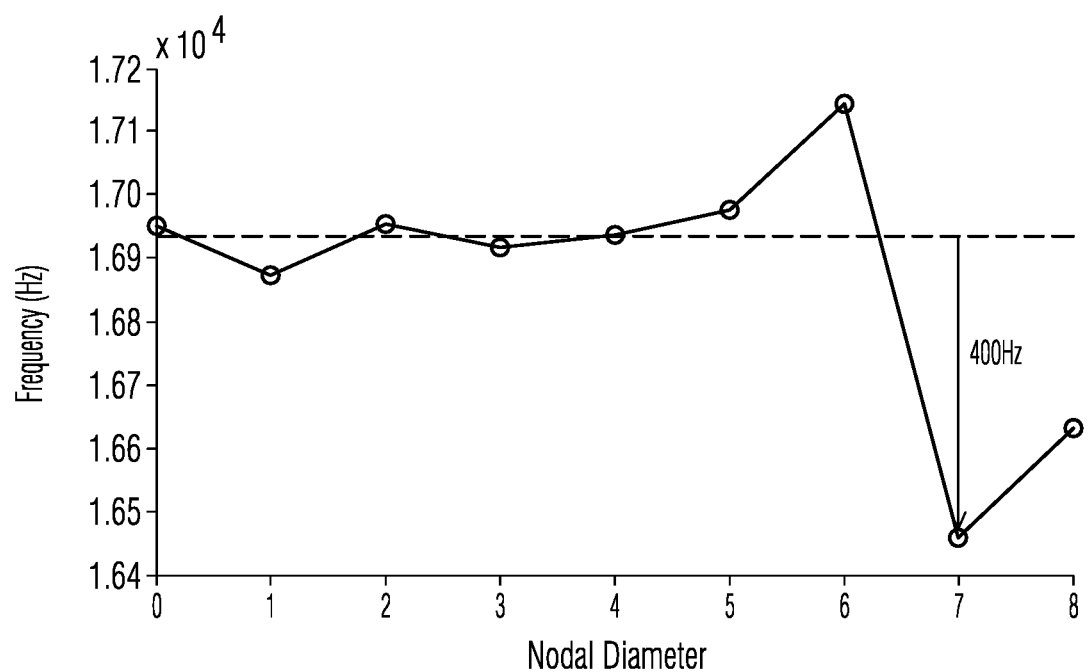
FIG. 15 is a nodal diameter plot for a failed IBD measured prior to failure.

Once the mode and the engine order of the excitation are known, the next investigation is to determine why this specific part failed and not others, and which other IBDs may be at risk for a similar failure. Typically, if a blade of an IBD has unusually high vibratory response, it is because it is acting as a tuned absorber. As described above, vibratory DNA can be defined to discriminate IBDs at risk for a tuned absorber problem. For example, a failed IBD had previously been bench tested and prior to failure had exhibited the nodal diameter plot depicted in FIG. 15 and the blade frequency ratios depicted in FIG. 16. When excited by a seven engine order excitation, the IBD blades had the peak amplitudes depicted in FIG. 17. It is clear from FIG. 17 that blade 11 had a much higher vibratory response than any of the other blades, i.e. it acted as a tuned absorber. An examination of the nodal diameter plot, FIG. 15, and the blade frequency ratio plot, FIG. 16, reveals that this happened for two reasons: 1) the frequency in the nodal diameter plot for a nodal diameter of 7 had a negative offset of about 400 Hz and blade 11 had a frequency that was unusually low, i.e. −3.1%. Consequently, it is likely that the cause of the high cycle fatigue failure was excessively high vibratory response excited by a 7 engine order excitation of an IBD with a 400 Hz offset in its seven nodal diameter frequency and with a blade that had large negative mistuning.

The second goal is to determine if any other IBDs in the fleet are at risk of having a failure from the same root cause. In this case, the vibratory DNA of the IBD that is relevant is its nodal diameter plot and blade frequency ratios in the family of modes that caused the failure. It is a straight forward process to search a database of fleet IBD vibratory DNA to identify IBDs with similar vibratory DNA. IBDs of the fleet can be grouped into categories based upon their risk of having a similar high cycle fatigue failure based upon having a similar vibratory DNA (see discussion of FIG. 5 above). IBDs in a higher risk category may be selected for a corrective action, such as removal from service, modification, or being used in an engine only when the engine is subject to more restrictive engine operating parameters effective to limit the stresses imparted to the IBD, such as lower power, temperature or pressure operation.

The third goal is to determine how to modify at-risk IBDs so that they can be returned to unrestricted service. For this purpose, it is possible to use the vibratory DNA with a reduced order model to determine what would happen to the vibratory response if either the nodal diameter plot or the blade's frequency ratio were changed. For example, if the frequency ratio of blade 11 were increased from −3.1% to −1%, the FMM reduced order model predicts that the maximum peak amplitude would be much lower, as shown in FIG. 18. In practice, this could be accomplished by slightly changing the geometry of the blade, e.g. by grinding off a small amount of the blade tip. Moreover, the amount of material that would have to be removed to change the frequency of the at-risk blade could be calculated on an IBD by IBD basis. This approach allows at-risk IBDs to be identified and modifications to be prioritized and customized for each specific IBD of a fleet.

If the test apparatus data does not indicate an unusually high level of stress at the crack initiation location, this may indicate that the driving forces that the IBD experienced in the engine are different than those used in the test apparatus. In this situation it is possible to use the vibratory DNA of the IBD to identify a vibration mode and engine order excitation which does, in fact, generate high stresses at the crack initiation location. For example, various different engine order excitations may be used with the vibratory DNA of the IBD in an attempt to identify any combination resulting in a max/mean stress ratio higher than a predetermined value at the crack initiation location. Due to the computational efficiency of the reduced order model/vibratory DNA approach, such evaluations can be done economically and promptly. Once identified, these vibration mode/engine order excitation combinations may be used in further virtual testing of other IBDs in the fleet by using fleet vibratory DNA values stored in a database from earlier testing in order to assign each fleet IBD to a category based upon its respective risk of developing a similar crack. Thus, the vibratory DNA allows the root cause evaluation to be extended from simply identifying a cause of a failure, to developing a preventive action for precluding additional failures, and to prioritizing the implementation of such preventive action.

OTHER EMBODIMENTS

While various embodiments of the present invention have been shown and described herein, it will be obvious that such embodiments are provided by way of example only. Numerous variations, changes and substitutions may be made without departing from the invention herein.

For example, other embodiments of the invention may include the following methods:

A method comprising: establishing a design of an integrally bladed disk (IBD) for a rotary machine; calculating a nodal diameter map for the IBD design using a finite element analysis; manufacturing the IBD according to the design; measuring vibration data while exciting the manufactured IBD in a test apparatus; determining a vibratory DNA of the manufactured IBD by fitting a reduced order model to the vibration data; and comparing the vibratory DNA to the nodal diameter map to determine a degree of conformance of the manufacturing step with the design.

A method comprising: establishing a database of vibratory DNA uniquely characterizing a vibratory state of each integrally bladed disk (IBD) of a fleet; performing a repair operation on one of the IBDs of the fleet; obtaining vibration data during excitation of the repaired IBD in a test apparatus; determining vibratory DNA of the repaired IBD from the vibration data; and accepting or rejecting the repaired IBD for continued operation in the fleet in response to a comparison of the vibratory DNA of the repaired IBD and vibratory DNA of other IBDs in the database. This method may be performed only if the repair operation is a blending operation exceeding a pre-established blending limit. This method may further comprise using the vibratory DNA of the repaired IBD to perform a virtual engine test of the repaired IBD to predict its vibratory response during operation in the fleet.

A method comprising: measuring vibration data during excitation of each of a plurality of integrally bladed disks (IBDs); using the vibration data to define a vibratory DNA for each IBD uniquely distinguishing a vibratory state of the respective IBD; using the vibratory DNA to categorize each IBD into one of at least two categories of relative risk of high cycle fatigue degradation; and performing a physical activity affecting an IBD in a higher risk one of the categories. The step of performing a physical activity in this method may further comprise removing the IBD in the higher risk category from service in a rotary machine, or performing a repair or modification of the IBD in the higher risk category, or modifying or adjusting a manufacturing process that had been used to produce the IBD in the higher risk category when producing additional IBDs, or performing a service activity in an order prioritized to the IBD in the higher risk category, or monitoring changes in the vibratory DNA of the IBD in the higher risk category over time. The step of defining a vibratory DNA for each IBD in this method may comprise identifying a nodal diameter plot and blade frequency ratios for each respective IBD. The step of categorizing each IBD into categories in this method may comprise using the vibratory DNA to predict whether or not each IBD will exhibit a tuned absorber in a selected vibration mode in response to a selected engine order excitation. This method may further comprise: performing a repair operation on one of the plurality of IBDs; obtaining vibration data during excitation of the repaired IBD in a test apparatus; determining vibratory DNA of the repaired IBD from the test apparatus vibration data; and using the vibratory DNA of the repaired IBD to accept or reject the repair operation.

Accordingly, it is intended that the invention be limited only by the spirit and scope of the appended claims.

The invention claimed is:
1. A method comprising:
measuring vibration measurements, using an optical point vibration measurement device, for each of a plurality of integrally bladed disks (IBDs) in a fleet of rotary machines based on driving each respective one of the IBDs using a first set of environmental conditions;
determining, based on a EzID product, corresponding values of a plurality of non-environmental parameters of a reduced order model for a design of the IBDs, which values cause the reduced order model to best fit the vibration measurements for each respective one of the IBDs wherein the non-environmental parameters include nodal diameter parameter and blade frequency parameter;
determining health of each respective one of the IBDs based upon their respective values of nodal diameter parameter and blade frequency parameter; and
based on the health of each respective one of the IBDs, performing at least one of removing the IBD from service in a turbine engine, returning the IBD to service in a turbine engine, performing a mechanical repair of the IBD, mechanically modifying the IBD, modifying a manufacturing process used to produce the IBD, modifying a physical operating condition of a rotary machine in which the IBD is operating to modify stresses imposed on the IBD, or performing a maintenance activity on a fleet of IBDs.

2. The method of claim 1, wherein the reduced order model is a Fundamental Mistuning Model (an FMM) and the nodal diameter parameter include at least two distinct tuned frequencies for at least one nodal diameter excited by at least one vibration mode, thereby characterizing vibratory interaction between blades and disk of at least one IBD.

3. The method of claim 2, wherein said driving each respective one of the IDBs using a set of environmental conditions comprises performing a test apparatus excitation.

4. The method of claim 1, wherein the step of measuring vibration measurements further comprises optical point measurements on both blades and disk of a respective IBD while exciting the respective IBD in a test apparatus.

5. The method of claim 1, further comprising performing a maintenance activity for the fleet based on the health comprising at least one of:
removing an IBD from operation in a rotary machine;
performing a repair of operational damage to an IBD;
performing a modification of an IBD; and
performing a service activity on a schedule prioritized based on health.

6. The method of claim 1, wherein:
said step of determining corresponding values of the plurality of non-environmental parameters further comprises:
determining values of nodal diameter and blade frequency of a subject IBD on a first date;
operating the subject IBD in a rotary machine for a period of time after the first date;
determining values of nodal diameter and blade frequency of the subject IBD on a second date following the period of time; and
the method further includes performing a maintenance activity responsive to a change in health for the subject IBD from the first date to the second date.

7. The method of claim 6, wherein the step of performing a maintenance activity comprises performing a repair of operational damage to a subject IBD; and the method further comprising:
measuring vibration measurements for the subject IBD post repair;
determining post-repair values of nodal diameter parameter and blade frequency parameter of the subject IBD; and
using the post-repair values of the subject IBD to evaluate the repair.

8. The method of claim 7, further comprising:
comparing the post-repair values of nodal diameter parameter and blade frequency parameter of the subject IBD to corresponding values of the subject IBD from prior to the period of operation in the rotary machine; and
evaluating the repair based on a result of the comparison.

9. The method of claim 1, wherein the method further comprises:
Using values of the nodal diameter parameter and blade frequency parameter of one of the IBDs to conduct a virtual engine test by calculating vibration data of the one of the IBDs using the reduced order model when using a second set of environmental conditions different from the first set of environmental conditions.

10. The method of claim 1, further comprising:
measuring engine test vibration data while operating a first one of the plurality of IDBs in a rotary machine; and
using the engine test vibration data and the nodal diameter parameter and blade frequency parameter of the first one of the plurality of IDBs in the reduced order model to calculate a second set of environmental conditions corresponding to engine operating conditions in the rotary machine.

11. The method of claim 10, further comprising using the second set of driving conditions corresponding to engine operating conditions in the rotary engine and values of nodal diameter parameter and blade frequency parameter of a second one of the plurality of IBDs to conduct a virtual engine test of the second one of the plurality of IBDs under the engine operating conditions by using the reduced order model to calculate second vibration data of the second one of the plurality of IBDs when using the second set of environmental conditions.

12. The method of claim 1, wherein:
said measuring vibration measurements further comprises measuring vibration of a subject IBD of the plurality of IBDs in the fleet at a first time;
the method further comprises performing a maintenance activity that comprises identifying a crack initiation location in the subject IBD at a second time following the first time by a period of operation of the subject IBD in a rotary machine; and
identifying a second set of environmental conditions experienced by the subject IBD during the period of operation by using the nodal diameter parameter and blade frequency parameter of the subject IBD and the reduced order model to identify a vibration mode and engine order excitation which generate a stress value higher than a predetermined value at the crack initiation location.

13. The method of claim 12, further comprising:
using the values of nodal diameter parameter and blade frequency parameter and the second set of environmental conditions to perform virtual engine tests on other IBDs of the fleet to determine respective health of each other IBD; and
assigning each of the other IBDs of the fleet to a category of health in response to a result of the respective virtual engine test.

14. The method of claim 13, wherein the category of health is one of at least one low risk category and at least one high risk category, the method further comprising performing a corrective action for IBDs of the fleet assigned to a higher risk one of the categories.

15. The method of claim 14, wherein the corrective action comprises one of the group of:
removing an IBD from operation in the fleet;
performing a modification of an IBD;
modifying a physical operating condition in at least one rotary machine in which an IBD of the fleet is operated; and
performing a service activity in the fleet on a schedule prioritized based on category.

16. A system configured for implementing the steps of claim 1.

17. The system of claim 16, wherein the system comprises full local capability for measuring the vibration measurements and for determining the corresponding values of the plurality of parameters, and wherein the physical state is indicative of a pass/fail condition of a tested IBD.

18. A method comprising:
measuring vibration measurements, using an optical point vibration measurement device, for each of a plurality of integrally bladed disks (IBDs) of a design in a fleet of rotary machines based on driving each respective one of the IBDs using a set of environmental conditions;

determining, based on a EzID product, values for a plurality of non-environmental parameters of a reduced order model for a design of the IBDs, which values cause the reduced order model to best fit the vibration measurements for each respective one of the IBDs wherein the non-environmental parameters include nodal diameter and blade frequency;

storing the values of nodal diameter and blade frequency in a database using less than 10 MB of data for up to 20 modes on up to 120 blades for each of the respective IBDs;

associating physical state information for at least one of the IBDs with the respective stored values of nodal diameter and blade frequency; and performing a fleet maintenance activity based on the stored values of nodal diameter and blade frequency and physical state information, by performing at least one of removing the IBD from service in a turbine engine, returning the IBD to service in a turbine engine, performing a mechanical repair of the IBD, mechanically modifying the IBD, modifying a manufacturing process used to produce the IBD, modifying a physical operating condition of a rotary machine in which the IBD is operating to modify stresses imposed on the IBD, or performing a maintenance activity on a fleet of IBDs.

19. A system configured for implementing the steps of claim 18.

20. A method comprising:

measuring vibration measurements, using an optical point vibration measurement device, for each of a plurality of integrally bladed disks (IBDs) in a fleet of rotary machines based on driving each respective one of the IBDs using a set of environmental conditions;

determining, based on a EzID product, corresponding values of a plurality of non-environmental parameters of a reduced order model for a design of the IBDs, which values cause the reduced order model to best fit—the vibration measurements for each respective one of the IBDs;

determining health of each respective one of the IBDs based upon the corresponding values of the plurality of non-environmental parameters; and, based on the health of each respective one of the IBDs, performing at least one of removing the IBD from service in a turbine engine, returning the IBD to service in a turbine engine, performing a mechanical repair of the IBD, mechanically modifying the IBD, modifying a manufacturing process used to produce the IBD, modifying a physical operating condition of a rotary machine in which the IBD is operating to modify stresses imposed on the IBD, or performing a maintenance activity on a fleet of IBDs.

21. A system configured for implementing the steps of claim 20.

* * * * *